US008172578B2

(12) United States Patent  
Clark et al.

(10) Patent No.: US 8,172,578 B2  
(45) Date of Patent: May 8, 2012

(54) SYSTEMS, PROGRAM PRODUCTS, AND METHODS OF ORGANIZING AND MANAGING CURRICULUM INFORMATION

(75) Inventors: Elizabeth A. Clark, Katy, TX (US); John Mathis, Bayou Vista, TX (US); David Lambson, Sugar Land, TX (US); Tom Black, Sugar Land, TX (US); Linda Helbach, Katy, TX (US); Darla Pollard, Katy, TX (US); Stephen Adams, Houston, TX (US)

(73) Assignee: Katy Independent School District, Katy, TX (US)

( * ) Notice: Subject to any disclaimer, the term of this patent is extended or adjusted under 35 U.S.C. 154(b) by 1105 days.

(21) Appl. No.: 11/076,398

(22) Filed: Mar. 9, 2005

(65) Prior Publication Data

US 2006/0035206 A1    Feb. 16, 2006

Related U.S. Application Data

(60) Provisional application No. 60/600,633, filed on Aug. 11, 2004.

(51) Int. Cl.  
*G09B 25/00* (2006.01)

(52) U.S. Cl. ........ 434/365; 434/118; 434/322; 434/323; 434/350; 434/353; 434/362; 705/1.1; 705/7.38; 705/7.39; 706/927; 707/792; 707/802

(58) Field of Classification Search ................ 434/350, 434/323, 322, 118, 353, 362, 365; 705/1.1, 705/7.38, 7.39; 706/927; 707/792, 802  
See application file for complete search history.

(56) References Cited

U.S. PATENT DOCUMENTS

| | | | | |
|---|---|---|---|---|
| 5,173,051 | A * | 12/1992 | May et al. ...................... | 434/118 |
| 5,385,475 | A * | 1/1995 | Sudman et al. ............ | 434/307 R |
| 5,601,432 | A * | 2/1997 | Bergman ...................... | 434/118 |
| 5,601,436 | A * | 2/1997 | Sudman et al. ............ | 434/307 R |
| 5,864,869 | A * | 1/1999 | Doak et al. .................. | 707/104.1 |
| 5,978,648 | A * | 11/1999 | George et al. ................. | 434/362 |
| 6,002,915 | A * | 12/1999 | Shimizu ....................... | 434/350 |
| 6,146,148 | A | 11/2000 | Stuppy et al. | |
| 6,149,441 | A | 11/2000 | Pellegrino et al. | |
| 6,322,366 | B1 * | 11/2001 | Bergan et al. ................. | 434/118 |
| 6,343,319 | B1 * | 1/2002 | Abensour et al. ............ | 709/219 |
| 6,347,333 | B2 * | 2/2002 | Eisendrath et al. ........... | 709/217 |

(Continued)

OTHER PUBLICATIONS eCollege, "Instructor User Guide", Mar. 2004, eCollege, p. 1-138.*

(Continued)

*Primary Examiner* — Xuan Thai  
*Assistant Examiner* — Jack Yip  
(74) *Attorney, Agent, or Firm* — Bracewell & Giuliani LLP

(57) ABSTRACT

Systems, program products, and methods of curriculum planning are provided. An embodiment of a system includes instructional course instructions, responsive to user input commands, to associate one of several instructional courses with one of several teachers, calendar instructions, responsive to user input commands, to create a calendar schedule and assign the instructional course to a date and time for display on the calendar schedule, lesson-plan assignment instructions, responsive to the calendar schedule and user input commands, to assign one of several lesson-plans to the instructional course at the date and time on the calendar schedule, and lesson-plan indicator instructions, responsive to the calendar schedule and lesson-plan data, indicating whether the instructional course for the date and time has been assigned a completed lesson.

15 Claims, 26 Drawing Sheets

U.S. PATENT DOCUMENTS

| | | | |
|---|---|---|---|
| 6,471,521 B1 | 10/2002 | Dornbush et al. | |
| 6,533,583 B1* | 3/2003 | Sportelli | 434/118 |
| 6,561,812 B1* | 5/2003 | Burmester et al. | 434/365 |
| 6,652,283 B1* | 11/2003 | Van Schaack et al. | 434/236 |
| 6,813,474 B2* | 11/2004 | Robinson et al. | 434/353 |
| 7,120,647 B2* | 10/2006 | Venkatesh et al. | 706/60 |
| 7,210,938 B2* | 5/2007 | Packard et | 434/365 |
| 7,362,997 B2* | 4/2008 | Hartenberger | 434/350 |
| 2001/0049087 A1* | 12/2001 | Hale | 434/350 |
| 2002/0055089 A1* | 5/2002 | Scheirer | 434/350 |
| 2002/0169822 A1* | 11/2002 | Packard et al. | 709/203 |
| 2003/0044762 A1* | 3/2003 | Bergan et al. | 434/350 |
| 2003/0049595 A1* | 3/2003 | Stuppy et al. | 434/350 |
| 2004/0009461 A1* | 1/2004 | Snyder et al. | 434/350 |
| 2004/0033475 A1* | 2/2004 | Mizuma et al. | 434/219 |
| 2004/0072130 A1* | 4/2004 | Safran, Sr. | 434/169 |
| 2004/0076941 A1* | 4/2004 | Cunningham et al. | 434/350 |
| 2004/0155452 A1* | 8/2004 | Sfassie | 283/38 |
| 2004/0161728 A1* | 8/2004 | Benevento et al. | 434/118 |
| 2005/0287510 A1* | 12/2005 | Sumrall et al. | 434/353 |
| 2006/0242004 A1* | 10/2006 | Yaskin et al. | 705/11 |
| 2006/0259351 A1* | 11/2006 | Yaskin et al. | 705/11 |

OTHER PUBLICATIONS

Blackboard, "Instructor Manual—Blackboard Learning System Release 6", Dec. 2, 2002, Blackboard Inc., p. 1-298.*

* cited by examiner

FIG. 7.

| Loggin as, | User Name | Home | Search | Toolbox | My Profile | Feed Back |
|---|---|---|---|---|---|---|
| | | Schedule Builder | Calendar | My Lessons | Documents | Reports |

Monday

⇞Schedule Builder
- Monday
- Tuesday
- Wednesday
- Thursday
- Friday
- Workstations

| Time | Activity | | |
|---|---|---|---|
| 8:00 AM - 9:00 AM | Math | Edit | Delete |
| 9:00 AM - 10:00 AM | History | Edit | Delete |
| 10:00 AM - 11:00 AM | Planning Period | Edit | Delete |
| 11:00 AM - 12:00 PM | Lunch | Edit | Delete |
| 12:00 PM - 1:00 PM | Science | Edit | Delete |

[Copy Schedule]  [Add Event]

Add Objective:

Content Area: Mathematics
Grade Level / Course: Algebra II
Six Weeks: 4th Six Weeks ● My Courses | ○ All Courses   [ Get Objectives ]

| Select | S | G | O | Objective | Clarifiers | Suggested Time (Days) | Objective Group | Unit Group |
|---|---|---|---|---|---|---|---|---|
| ☐ | | | | Graph quadratic functions and solve the related quadratic equations and inequalities by graphing. (TAKS 11) | 1 | 1 | | |
| ☐ | | | | Solves quadratic equations and equalities by factoring. (TAKS 11) | 1 | 1 | | |
| ☐ | | | | Solves quadratic equations by completing the square including using a visual model. (TAKS 11) | 2 | 2 | | |
| ☐ | | | | Given real world and purely mathematical situations, use the characteristics of the quadratic parent function to sketch the related graphs and connects between general and standard forms of a quadratic function. | 2 | 1 | | |
| ☐ | | | | Derive the quadratic formula and solve quadratic equations by applying the quadratic formula. | 8 | 1 | | |
| ☐ | | | | Given both real-world and purely mathematical situations, the student formulates and solves systems of equations involving quadratics both graphically and algebraically. | 6 | 2 | | |

[ Add To Lesson ]   [ Cancel ]

Add Resources:

Solves quadratic equations by completing the square including using a visual model. (TAKS 11)

Select   Resource Name

☐ Glencoe, Algebra 2
Chapter or Lesson Title: sec. 6-3
Page (s): 346 - 352

☐ Modeling Mathematics Masters - Algebra 2
Chapter or Lesson Title: Completing the Square
Page (s): 40 - 42

[ Add To Lesson ]   [ Cancel ]

Add Strategies:

Selected Objectives
1. Solves quadratic equations by completing the square including using a visual model. (TAKS11)

- ● District Focus    ○ Best Practice    ○ Content Specific

☐ Concept Definition Maps
☐ Content Frames
☐ Etch-A-Sketch
☐ Free Form Mapping
☐ K - W/E - L
☐ Magnet Summary
☐ Say What?
☐ Sticky Note Notation
☐ Two Column Notes Dialectical Notebook
☐ Two Column Notes Hypothesis - Evidence Notes
☐ Two Column Notes Main Idea Detail Notes
☐ Two Column Notes Opinion Proof Notes
☐ Two Column Notes Problem Solution Notes
☐ Two Column Notes Process Notes
☐ Two Column Notes Right Side Left Side Interactive Student Notebooks

[ Add To Lesson ]    [ Cancel ]

Add Assessment Formats:

Selected Objectives
1. Solves quadratic equations by completing the square including using a visual model. (TAKS11)

- ☐ Competency Check List
- ☐ Conference
- ☐ Conversation and Dialogue
- ☐ Cues and Questions
- ☐ Diagrams
- ☐ Essays
- ☐ Graduated Difficulty
- ☐ Journal
- ☐ Lab Report
- ☐ On-going Record of Progress
- ☐ Performance/Recitations/Oral Reports
- ☐ Portfolio
- ☐ Product
- ☐ Quiz
- ☐ Retellings
- ☐ Teacher Observation
- ☐ Test

[ Add To Lesson ]   [ Cancel ]

Lesson Detail:

* Key Word: Math
Content Area: Mathematics
Grade Level / Course: Algebra II

* Activity: (Max 1000): 23 — Activity 1, Activity 2
Homework: (Max 500): 23 — Homework 1, Homework 2
Notes: (Max 500): 17 — Notes 1, Notes2
Materials: (Max 500): 25 — Materials 1, Materials2

288
292
294
290

* = Required

Apply | Cancel | Delete

```
                                306           302         304
                                              ☑ Lesson Complete  ☑ Share Lesson
285        Key Word: MATH  edit
                        280  Mathematics - Algebra II
                                                                    Created by:
           Selected Objectives and Resources:  282
           [Remove]  1. Solves quadratic equations by completing the square including using a
                         visual model. (TAKS 11)                    [+Custom Resource]
                         Resource(s)
           [Remove]      Glencoe, Algebra 2
                         Chapter or Lesson Title: sec. 6-3
                         Page (s): 346 - 352
           [Remove]      Modeling Mathematics Masters - Algebra 2
285   284                Chapter or Lesson Title: Completing the Square
                         Page (s): 40 - 42
           Strategies:
285   [Remove] Concept Definition Maps  286
       [Remove] Content Frames
           Assessment Formats:
           [Remove] Competency Check List
           [Remove] Conference
           Activity:
288        Activity 1
           Activity 2
           Materials:
290        Materials 1
           Materials2
           Homework Items:
292        Homework 1
           Homework 2
           Notes:
294        Notes 1
           Notes2

View Unassigned Lesson Plans:

Key Word: Content Area: Grade Level / Course:
[ ] [Mathematics ▽] [Algebra II ▽]
[ Get Lessons ]

| Key Word | Activity | Completed | Shared | | | |
|---|---|---|---|---|---|---|
| Math | Activity 1<br>Activity 2 | ☑ | ☑ | [ Assign ] | [ Edit ] | [ Delete ] |

SYSTEMS, PROGRAM PRODUCTS, AND METHODS OF ORGANIZING AND MANAGING CURRICULUM INFORMATION

RELATED APPLICATION

This application claims benefit from U.S. Provisional Application No. 60/600,633 filed Aug. 11, 2004.

BACKGROUND OF THE INVENTION

1. Field of the Invention

The present invention relates generally to curriculum organization and, more particularly, to systems, program products, and methods of organizing and managing curriculum information for teachers within an educational institution.

2. Description of Related Art

In educational institutions it is often necessary to organize and manage curriculum information for each instructional course. For example, an educational institution may utilize a calendar schedule of curriculum objectives and lesson-plans for any particular instructional course. The curriculum objectives and lesson-plans enable teachers to prepare a methodology for teaching a particular instructional course at a particular date and time on the calendar schedule.

Prior versions of organization and management systems utilized rudimentary procedures comprising boxes of stored notebooks or file cabinets containing books and papers. Such organization and management systems covered a lot of physical space on the premises of the educational institution and became disorganized unless substantial efforts were undertaken to continually re-organize the notebooks or files into a library of curriculum objectives and lesson-plans. Moreover, because it may take an overabundance of time for an administrator or teacher to search through the notebooks and files, such an organization and management system has proved to be quite inefficient. The time and effort necessary to search through the materials thus impeded on the time and effort the administrator or teacher could apply toward performing other more important duties.

An alternative system is desired for preserving physical space in the educational facility, as well as providing a more efficient and effective ways of organizing, managing, and distributing calendar schedules of lesson-plans and lesson objectives to administrators and teachers at the educational institution.

SUMMARY OF THE INVENTION

In view of the foregoing, embodiments of the present invention advantageously provide enhanced systems, program products, and methods of curriculum planning to allow a teacher or supervisor to organize and manage lesson-plans in a computer readable format. Embodiments of the present invention also advantageously provide an instructional term curriculum schedule to establish multiple teachers teaching multiple courses for a future instructional term. Embodiments of the present invention additionally advantageously provide lesson-plans assigned to instructional courses on the future schedule for easy access by teachers and administrators. Embodiments of the present invention further advantageously provide a teacher share-network which enables teachers to share and easily access through a computer system lesson-plans from other teachers in the share-network. Embodiments of the present invention still further advantageously provide the ability for teachers to easily access through a computer system lesson-plans from previous years. Embodiments of the present invention also advantageously provide a lesson-plan indicator to easily notify to a teacher or administrator whether a completed lesson-plan has been assigned to an instructional course.

More specifically, embodiments of the present invention advantageously provide a system to enhance organization and management of lesson-plans, including instructional course instructions responsive to user input commands to associate one of a plurality of instructional courses with one of a plurality of teachers, calendar instructions responsive to user input commands to create a calendar schedule and assign the instructional course to a date and time on the calendar schedule for display on the calendar schedule, lesson-plan assignment instructions responsive to the calendar schedule and user input commands to assign one of a plurality of lesson-plans to the instructional course at the date and time on the calendar schedule, and lesson-plan indicator instructions responsive to the calendar schedule and lesson-plan data to indicate on the calendar schedule whether the instructional course for the date and time on the calendar schedule has been assigned a completed lesson-plan.

Embodiments of the present invention also advantageously provide a method to enhance organization and management of lesson-plans. For example, embodiments of the method include associating one of a plurality of instructional courses with one of a plurality of teachers, assigning one of a plurality of lesson-plans to the instructional course at the date and time on the calendar schedule, and indicating on the calendar schedule whether the instructional course for the date and time on the calendar schedule has been assigned a completed lesson-plan.

Embodiments of the present invention also advantageously provide a computer-readable medium that is readable by a computer. For example, embodiments of the medium include a set of computer-executable instructions that, when executed by the computer, cause the computer to perform the following operations: associate one of a plurality of instructional courses with one of a plurality of teachers; create a calendar schedule and assign the instructional course to a date and time on the calendar schedule for display on the calendar schedule; assign one of a plurality of lesson-plans to the instructional course at the date and time on the calendar schedule; and indicate on the calendar schedule whether the instructional course for the date and time on the calendar schedule has been assigned a completed lesson-plan.

Embodiments of the present invention enhance the entire instructional process by providing teachers and administrators the efficiencies of using a computer system to assign and access lesson-plans to a future calendar schedule of instructional courses. Embodiments notify teachers and administrators when there are instructional courses on the schedule that have not yet been assigned lesson-plans. Embodiments also enable teachers and administrators to access lesson-plans from previous years on the computer system. Embodiments further enable a number of sharing teachers to form a share-network to share lesson-plans among each other on the computer system.

BRIEF DESCRIPTION OF THE DRAWINGS

Some of the features, advantages, and benefits of the present invention having been stated, others will become apparent as the description proceeds when taken in conjunction with the accompanying drawings, in which:

FIG. 7 is a screen view displaying a teacher profile according to an embodiment of the present invention;

FIG. 8 is a screen view displaying a schedule bank according to an embodiment of the present invention;

FIG. 9 is a screen view displaying a week view of a calendar schedule according to an embodiment of the present invention;

FIG. 11 is a screen view displaying the calendar schedule of FIG. 9 having instructional courses or other events applied to the calendar schedule according to an embodiment of the present invention;

FIG. 13 is a screen view displaying a "Lesson Bank" page according to an embodiment of the present invention;

FIG. 14 is a screen view displaying a "Previous Years Lessons" page according to an embodiment of the present invention;

FIG. 16 is a screen view displaying a "Shared Lessons" page according to an embodiment of the present invention;

FIG. 18 is a screen view displaying lesson objectives according to an embodiment of the present invention;

FIG. 20 is a screen view displaying lesson resources according to an embodiment of the present invention;

FIG. 21 is a screen view displaying lesson strategies according to an embodiment of the present invention;

FIG. 22 is a screen view displaying lesson assessments according to an embodiment of the present invention;

FIG. 23 is a screen view displaying other lesson details according to an embodiment of the present invention;

FIG. 24 is a screen view displaying a completed lesson plan according to an embodiment of the present invention; and FIG. 25 is a screen view displaying a "Lesson Bank" page including a completed lesson therein according to an embodiment of the present invention.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. The prime notation, if used, indicates similar elements in alternative embodiments.

Figure 1:
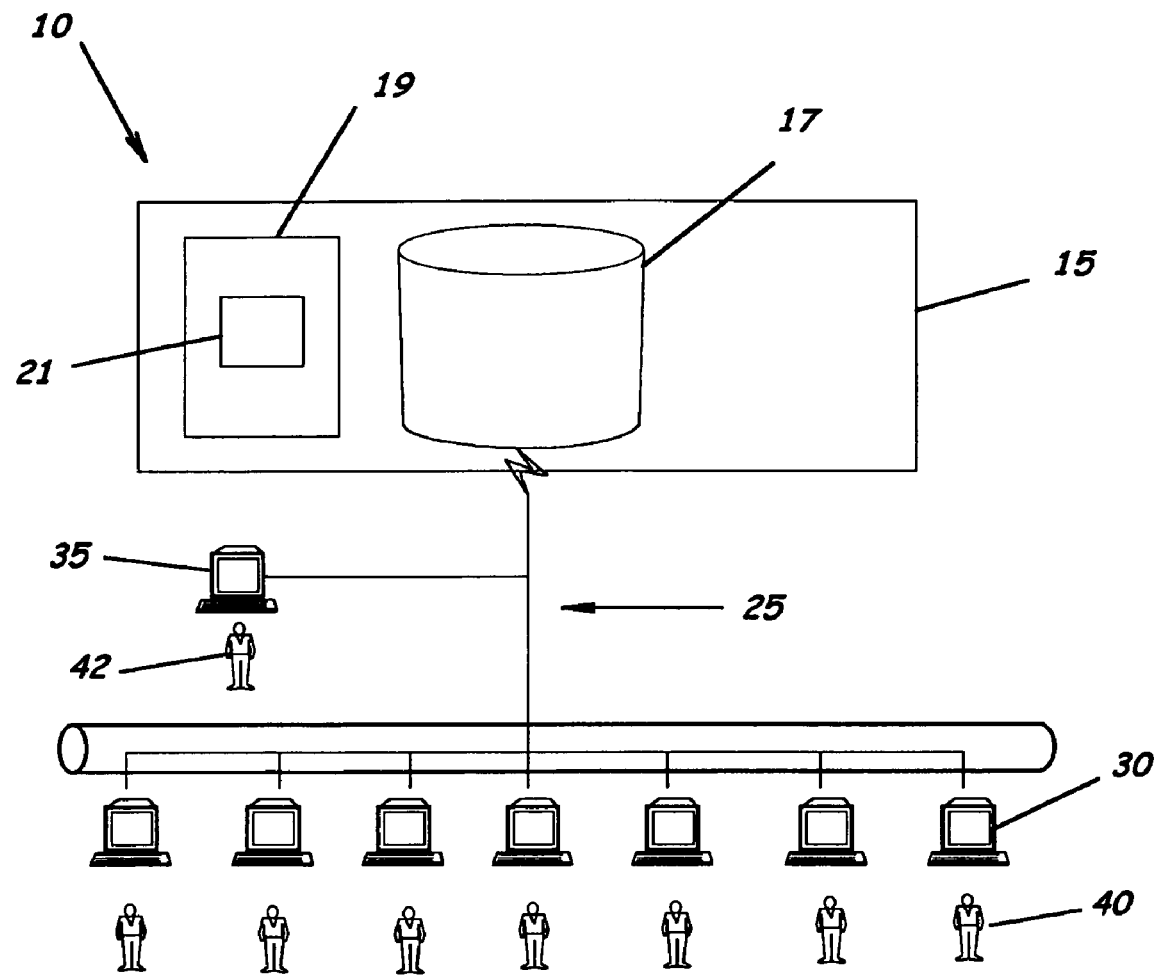
FIG. 1 is a schematic diagram of a system to enhance organization and management of curriculum information according to an embodiment of the present invention.

FIG. 1 shows a schematic diagram of a system 10 to organize and manage curriculum information according to an embodiment of the present invention, which can be arranged and programmed to perform the functionality or method of embodiments of the present invention. As shown, one of the embodiments of the system 10 includes a computer defining a server 15 interfaced with a communication network 25, a plurality of client computers 30 interfaced with the communication network 25, and a plurality of potential users 40 or teachers 40, for example, interfaced with the client computers 30. Also, FIG. 1 shows an administrative computer 35 interfaced with the communication network 25, and a user 42 or administrator 42, for example, interfaced with the administrative computer 35. The client computers 30 and the administrative computer 35 are remote from and in communication with the server 15 through the communication network 25. The server 15 has a database 17 and memory 19 associated therewith. The memory 19 contains a computer program product 21 such as in the form of program code or instruction blocks, as understood by those skilled in the art, to perform some of the features or the functionality of the computer system 10.

The administrator 42 is responsible for establishing an instructional term curriculum schedule through the administrative computer 35. The administrator 42 establishes a plurality of teachers as teaching a plurality of predetermined instructional courses at a plurality of predetermined dates and times during a future instructional term on an instructional term curriculum schedule for the future instructional term. The server 15 can communicate the instructional term curriculum schedule to each of the teachers 40 through the client computers 30. Alternatively, the administrator 42 can print out or otherwise copy the instructional term curriculum schedule from the administrative computer 35, and deliver the instructional term curriculum schedule to each of the teachers 40 by a procedure other than by through the client computers 30.

Figure 6:
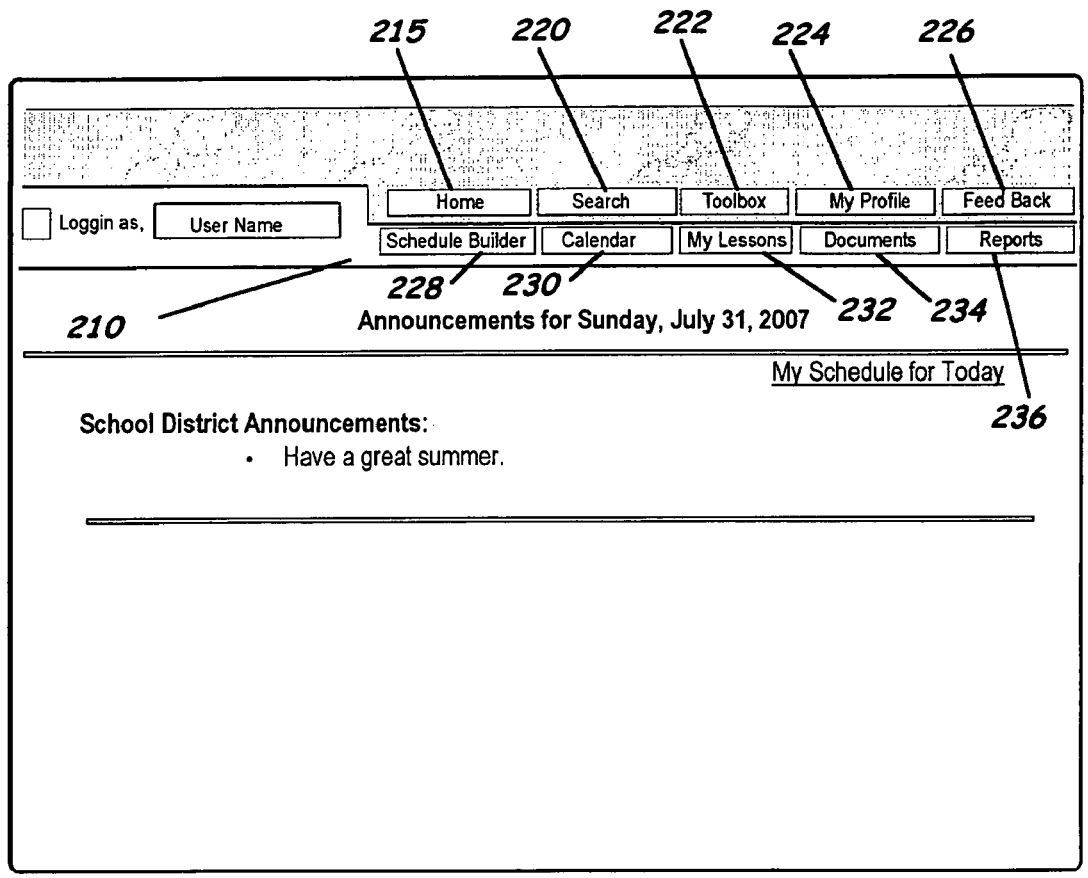
FIG. 6 is a screen view (i.e., front plan view) from a user interface displaying a home page and navigation toolbar of the organization and management system according to an embodiment of the present invention.

The users of the client computers 30 and administrative computer 35 can enter information into the system 10 and view information from the system 10 by selecting from a number of toolbar icons 215 on a toolbar 210 displayed on a graphical user interface (GUI) from the internet/intranet server 15, as shown, for example, in the screen view of FIG. 6. As understood by those skilled in the art, the instruction blocks 21 in the memory 19 can provide instructions to implement a graphical user interface with a toolbar 210 having toolbar icons 215. The instruction blocks 21 also provide instructions to disclose information from the database 17 on the graphical user interface relating to subject matter represented by the specific toolbar icons 215 on the toolbar 210. In addition, the instruction blocks 21 in the memory 19 can provide instructions granting the user the ability to access the information relating to the specific toolbar icons 215 on the toolbar 210 of the graphical user interface, and can also provide instructions enabling the user to input information into the graphical user interface or modify information existing on the graphical user interface.

The server 15, the client computers 30, and the administrative computer 35, for example, can be a personal computer, mid-range computer, or a mainframe computer. The server 15, for example, can be a larger computer having more memory and features. The client computers 30 and administrative computer 35, for example, can be personal computers dispersed in an office environment and in communication with the server 15 through an Internet or Intranet network, for example. Each of the computers 15, 30, 35 can include a hard drive, a display or monitor such as a CRT, LCD, or other monitor screens. The computers 15, 30, 35 can also include a database for storing information and memory in which computer programs may be stored or reside. The computers 15, 30, 35 can also include one or more user interfaces such as keyboards, mice, data collections, touch-screens, graphical display toolbars and icons, or other devices, with which information and data are transferred between the user and the computer. Other output devices may also be included such as printers, facsimile machines, and other such devices as understood by those skilled in the art.

The server 15, each of the client computers 30, and the administrative compute 35 preferably include a central processing unit (CPU), a read-only memory (ROM), and a random-access memory (RAM), as understood by those skilled in the art. The computers 15, 30, 35 may be a stand-alone system or part of a network such as a local-area-network (LAN) or a wide-area-network (WAN). The server 15, the administrative computer, and the client computers 30 can be interconnected among each other via a global communication network 25 such as the Internet, or a local communication network 25 such as an Intranet that is accessible only within a particular organization. Users may access the server 15 through the client computers 30 via the communication network 25.

As understood by those skilled in the art, other computer system configurations can also be employed to perform the functionality of the invention, and to the extent that a particular system configuration is capable of performing embodiments of methods of the present invention.

Once the computers are programmed or loaded with software or program product to perform particular functions pursuant to instructions from program software that implements the functionality or method of this invention, such computer systems in effect become special-purpose computers particular to the functionality or method of this invention and are also well known to those skilled in the art of computer systems.

In addition, computer programs or program product stored in a tangible computer medium implementing the functionality or method of this invention will commonly be distributed to users on a distribution medium, such as floppy disk, CD-ROM, or other computer-readable media. The term "computer-readable medium" encompasses distribution media, intermediate storage media, execution memory of a computer, and any other medium or device capable of storing a computer program implementing the functionality or methods of embodiments of the present invention for later reading by a computer system. The computer program will often be copied from the computer-readable medium to a hard disk or a similar intermediate storage medium. When the programs are to be run, they will be loaded either from their distribution medium or their intermediate storage medium into the execution memory of the computer, configuring the computer to act in accordance with the functionality or method of this invention. All such operations are well known to those skilled in the art of computer systems.

As understood by those skilled in the art, various software modules or program product can be used within the computer system in the embodiments of the invention. The client computers 30 have client software stored thereon that preferably includes software modules such as a client graphical user interface (GUI), a data generator, a data requester, a secure client connector, and a database of information, each of which is understood by those skilled in the art. The data requester requests data from a user, and the data generator generates the different user-specific employee forms displayed on the GUI in which information may be entered about the human resource manning plan or the employment development plan. The database is used to store the employee forms and other information regarding the organization and its employees. The client computer GUI provides a visually pleasing graphical user interface on a monitor to facilitate the input and output of data by a user who is using the client software within the client computers 30. The secure client connector establishes a private communication session between the client computers 30 and the server 15, and between the administrative computer 35 and the server 15.

As also understood by those skilled in the art, the server 15 may include software modules or program product such as a secure server connector, a client confirmer, a security check, a data mover, and a transmission confirmer. The secure server connector allows the client computers 30 to communicate with the server 15 while keeping the nature of the communications private. The client confirmer and the security component confirm the identity of the client computers 30, and effectively detect the specific user accessing the server database 17 at a particular point in time. The data mover receives data from the client computers 30, and transmits data among the several client computers 30 and the server 15. The transmission confirmer, for example, can verify that particular information in the database 17 has been transmitted to the several client computers 30.

As understood by those skilled in the art, the database 17 for embodiments of the system 10, for example, can reside in a web-based internet/intranet server 15. The database 17 within the server 15 may itself comprise several sub-databases, which contain independent blocks of information. For example, one sub-database may include data relating to the instructional term curriculum schedule, and another sub-database may include data relating to the calendar schedule. The main database preferably resides within the server 15, but can also be in other ways associated with the server 15 such as by communication with the server 15 via a LAN, via a global communications network such as the Internet, or via a local communications network such as an organization's Intranet. Also, for example, the server 15 can itself include one or more of a plurality of computers, each with a sub-database residing thereon.

Figure 2:
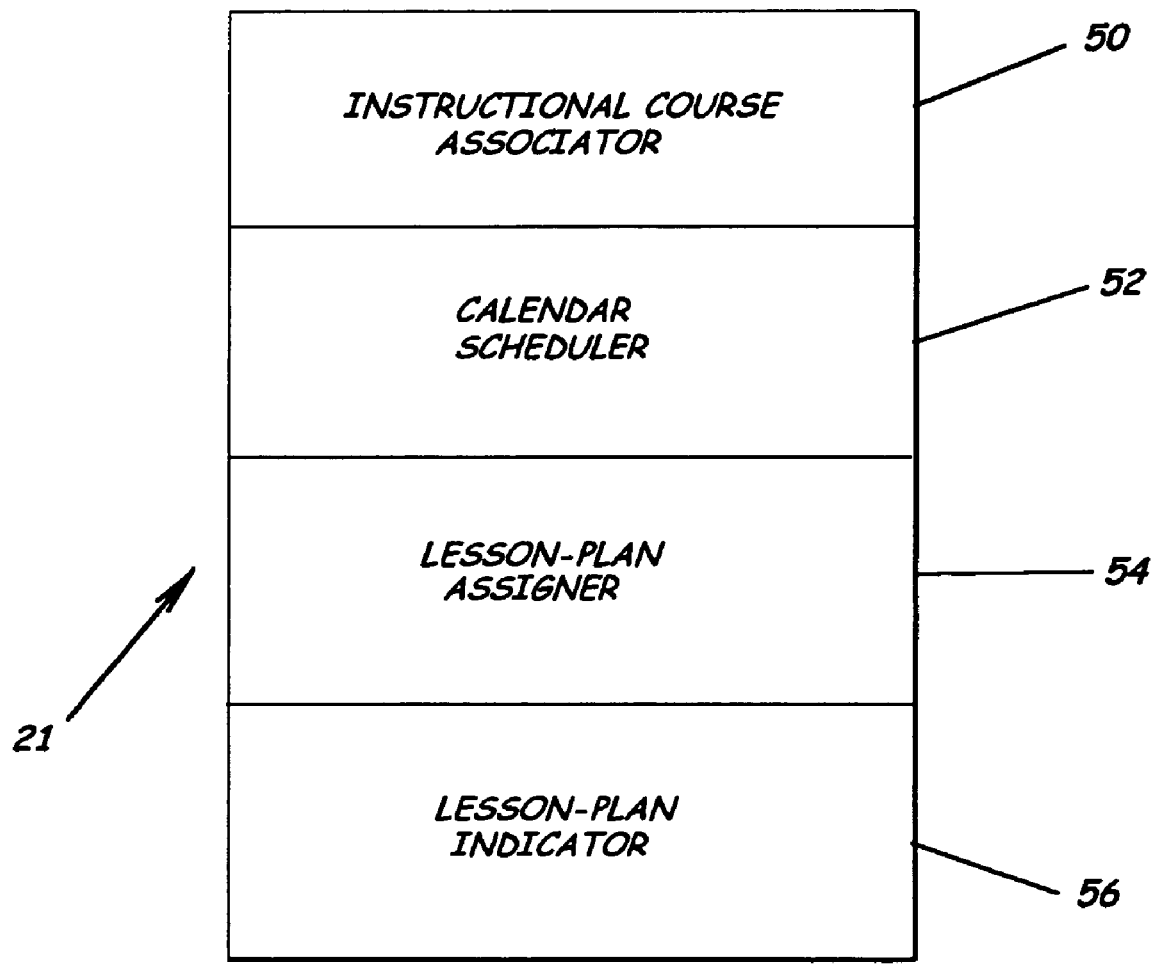
FIG. 2 is a block diagram of a computer program product to enhance organization and management of curriculum information according to an embodiment of the present invention.

Program product 21 such as in the form of computer program code instruction blocks is stored in the memory 19 of the server 15 to perform the functionality of the computer system 10. As shown in FIG. 2, the instruction blocks 21 may be in the form of the following: an instructional course associator 50 including instructional course instructions, responsive to user input commands, to associate one of a plurality of instructional courses with one of a plurality of teachers; a calendar scheduler 52 including calendar instructions, responsive to user input commands, to create a calendar schedule and to assign the instructional course to a date and time on the calendar schedule for display on the calendar schedule; a lesson-plan assigner 54 including lesson-plan assignment instructions, responsive to the calendar schedule and user input commands, to assign one of a plurality of lesson-plans 300 to the instructional course at the date and time on the calendar schedule; and a lesson-plan indicator 56, responsive to the calendar schedule and lesson-plan data, to indicate on the calendar schedule whether the instructional course for the date and time on the calendar schedule has been assigned a completed lesson-plan 300.

Figure 3:
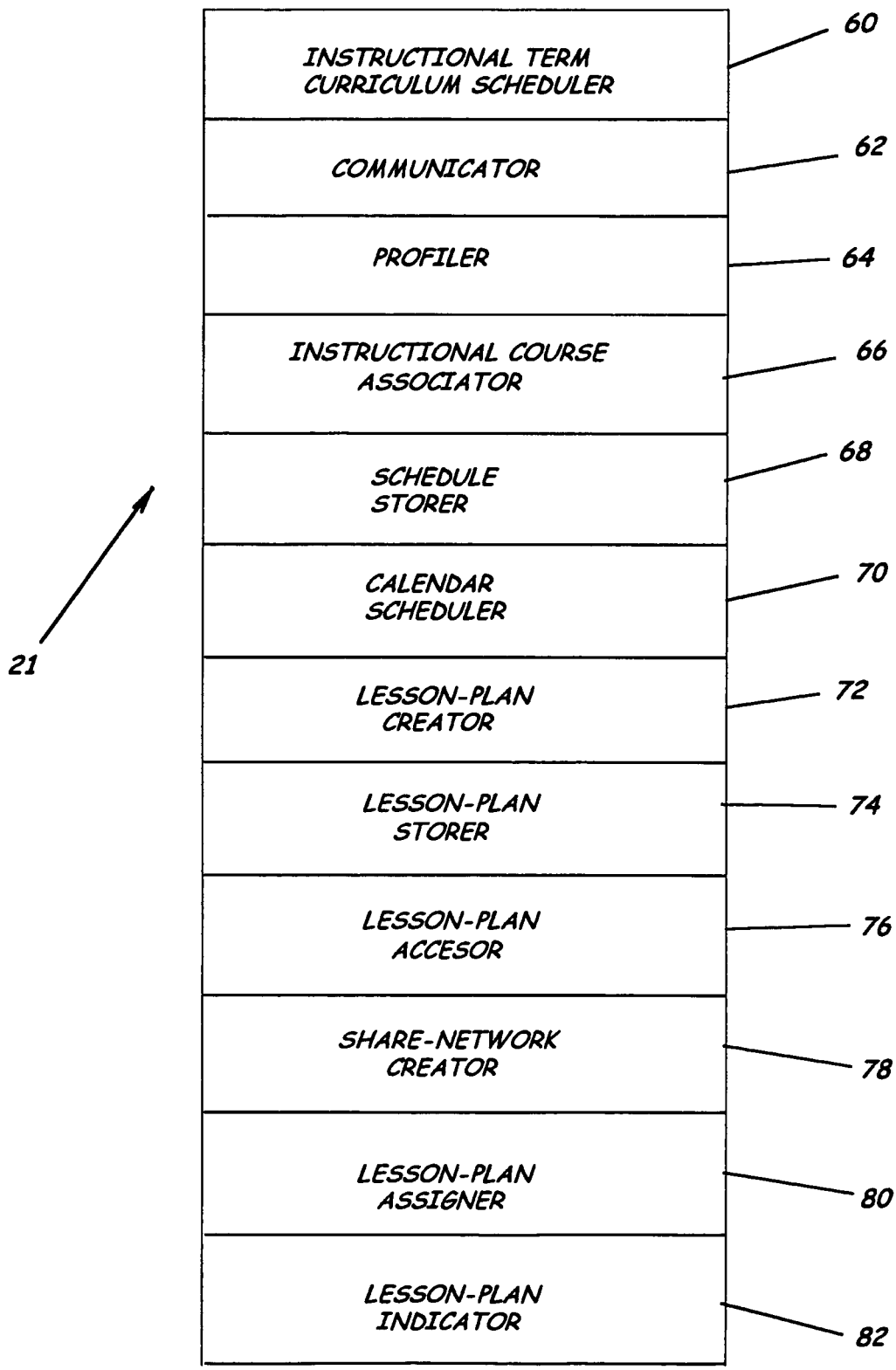
FIG. 3 is a block diagram of a computer program product to enhance organization and management of curriculum information according to an embodiment of the present invention.

As shown in FIG. 3, other program code instruction blocks can also be included in the computer program product 21 stored in the memory 19 of the server 15. Such instruction blocks 21 can be in the form of the following: an instructional term curriculum scheduler 60 including establishing a plurality of teachers as teaching a plurality of predetermined instructional courses at a plurality of predetermined dates and times during a future instructional term on an instructional term curriculum schedule for the future instructional term; an instruction communicator 62 including communicating the instructional term curriculum schedule to each of the plurality of teachers; a profiler 64 including creating an individual teacher profile for each of the plurality of teachers; an instructional course associator 66 including associating one of the plurality of predetermined instructional courses from the instructional term curriculum schedule with one of the plurality of teachers by assigning the predetermined instructional course to one of the plurality of teacher profiles; a schedule storer 68 including creating a schedule depository and to assign the predetermined instructional course to a day of the week and time in the schedule depository for storage in the schedule depository; a calendar scheduler 70 including creating a calendar schedule and assigning the predetermined instructional course to the predetermined date and time on the calendar schedule for display on the calendar schedule; a lesson-plan creator 72 including creating a plurality of lesson-plans 300 for a particular teacher and a particular instructional course; a lesson-plan storer 74 including creating a lesson-plan depository and assigning the lesson-plans 300 to the lesson-plan depository for storage in the lesson-plan depository; a lesson-plan accessor 76 including accessing one of the teacher's lesson-plans 300 from at least one of a plurality of school years; a share-network creator 78 including creating a plurality of sharing teachers from the plurality of teachers on a share-network, the sharing teachers having a plurality of shared lesson-plans 300 from one of a plurality of school years to share with other sharing teachers through the communication network; a lesson-plan assigner 80 including assigning one of the lesson-plans 300 to the instructional course at the date and time on the calendar schedule; and a lesson-plan indicator 82 including indicating on the calendar schedule whether the instructional course for the date and time on the calendar schedule has been assigned a completed lesson-plan 300.

The system can also include Microsoft, SAP, and Oracle web-based applications, which can read from each other. The system 10 typically features a search engine for user convenience. The system 10 also typically has a robust security system, as understood by those skilled in the art.

Figure 4:
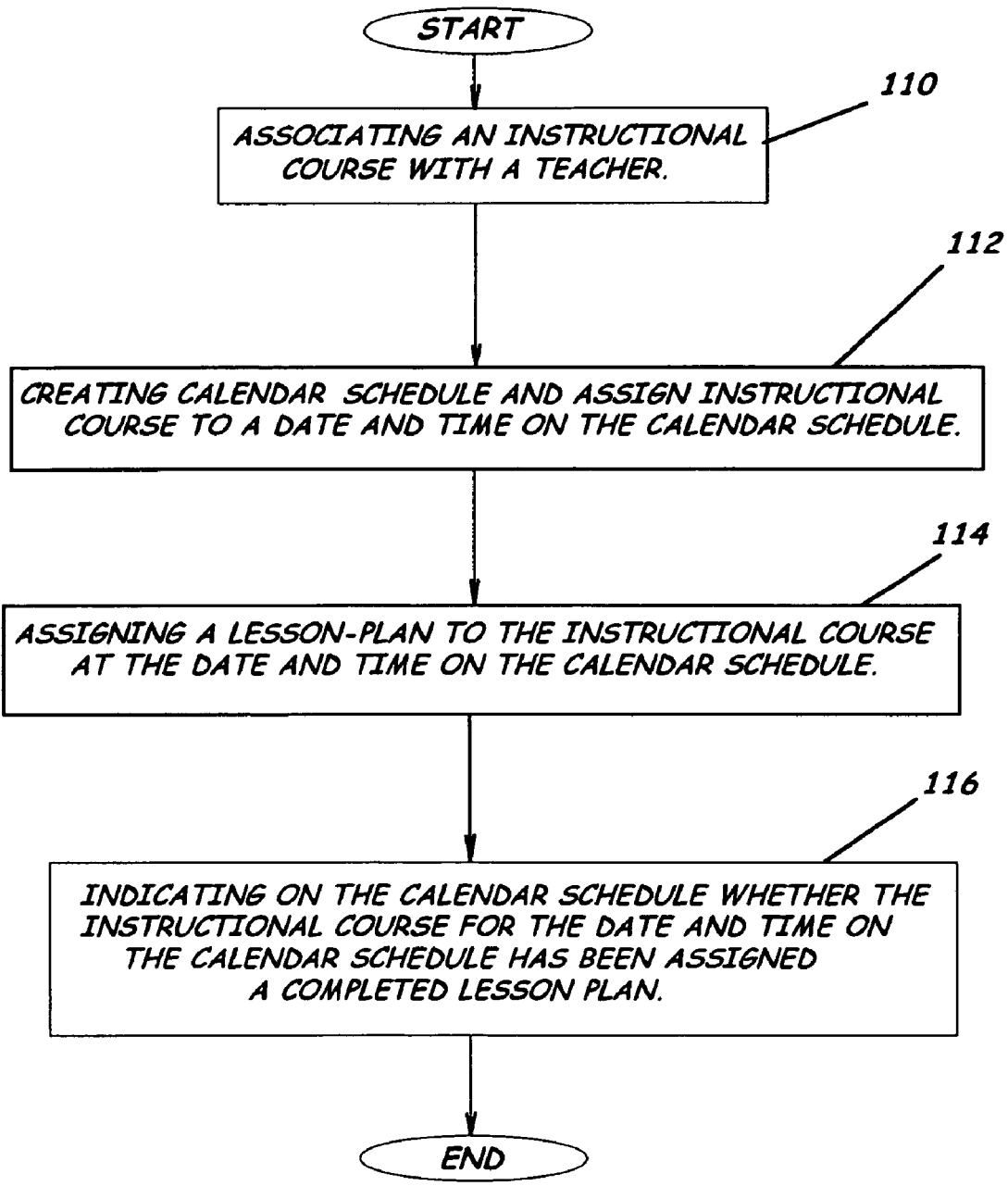
FIG. 4 is a block diagram of operations of a system to enhance organization and management of curriculum information according to an embodiment of the present invention.
Figure 5A:
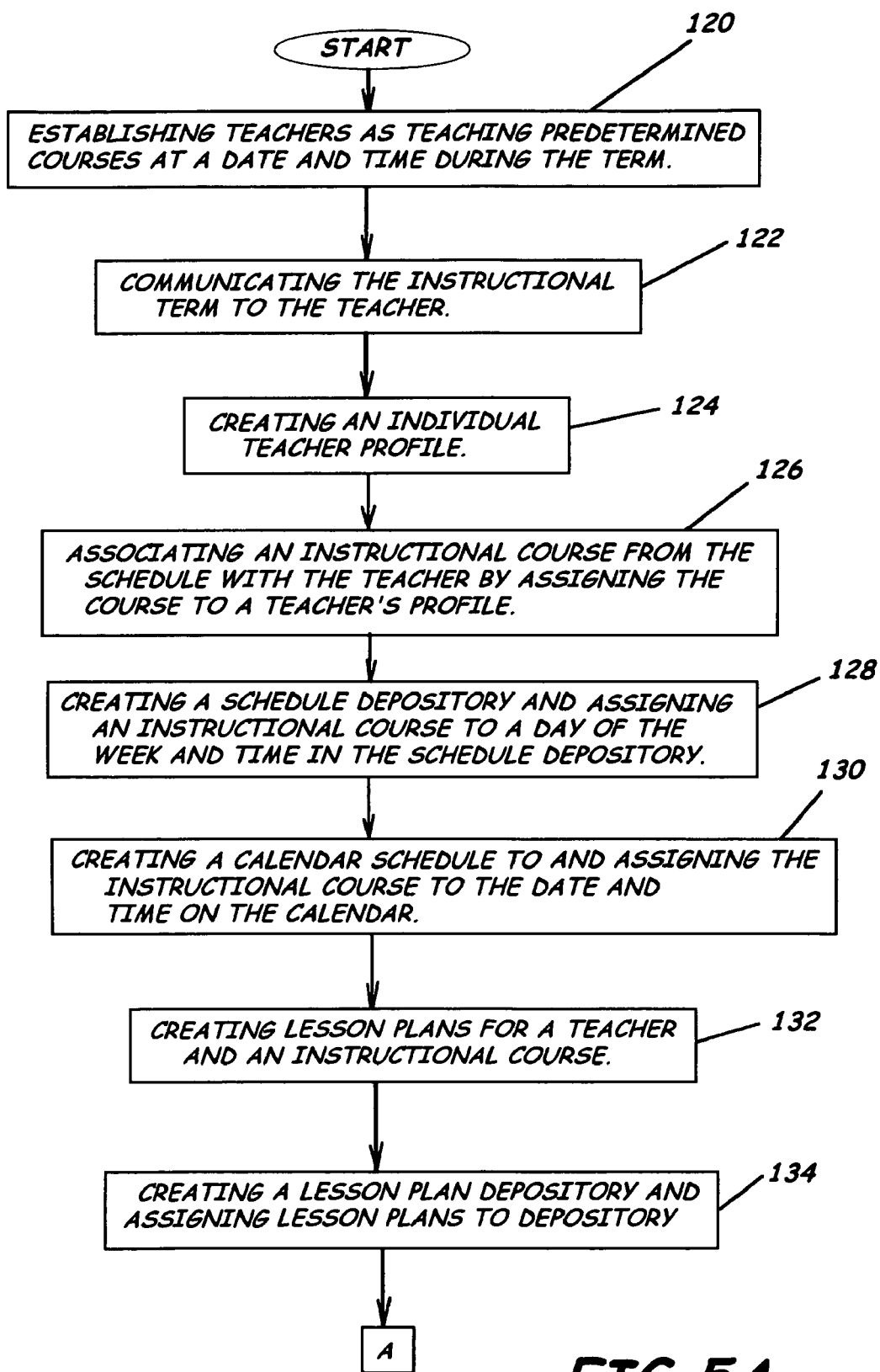
FIG. 5A and FIG. 5B present a block diagram of operations of a system to enhance organization and management of curriculum information according to an embodiment of the present invention.
Figure 5B:
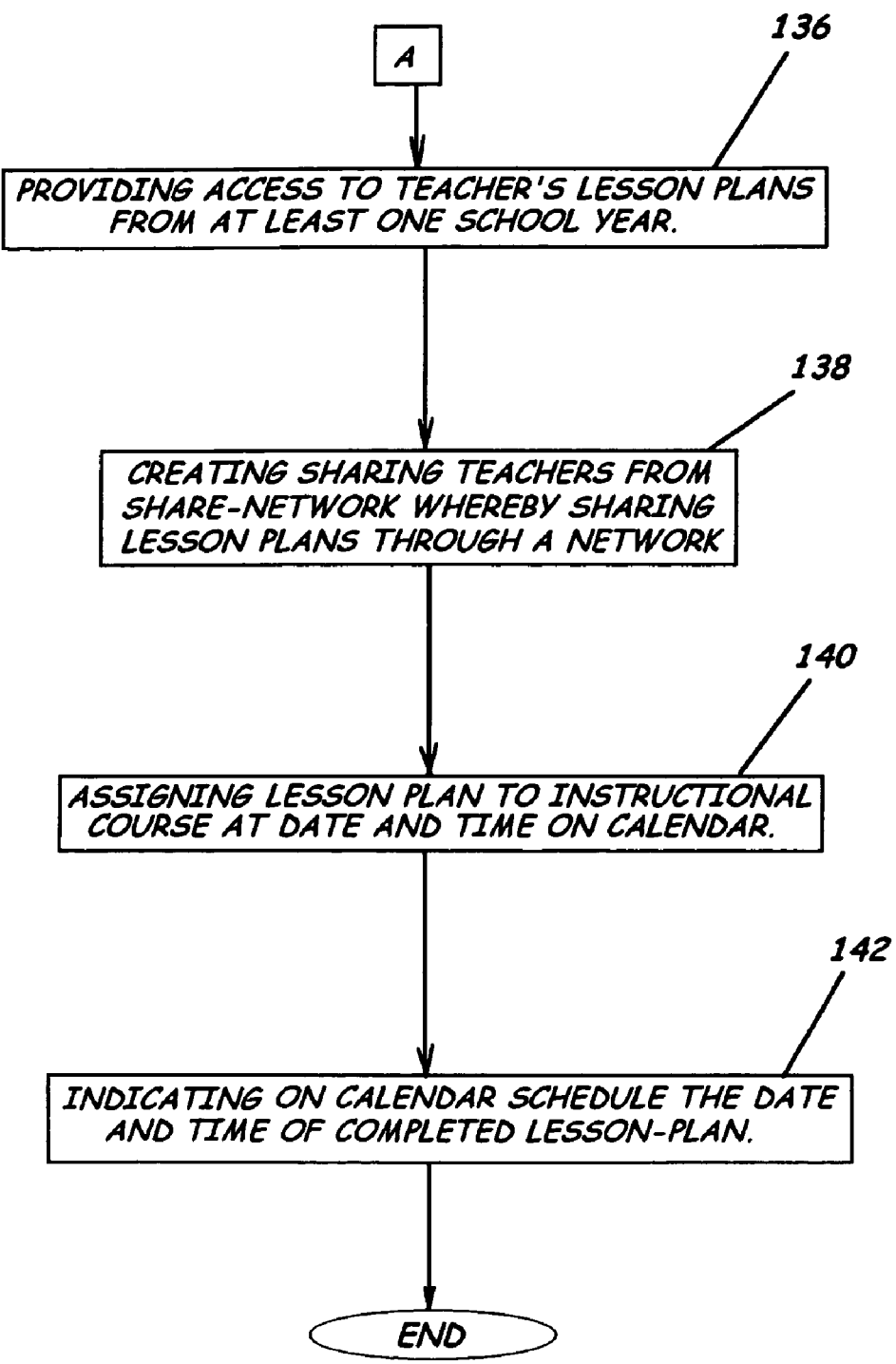

FIG. 4, FIG. 5A and FIG. 5B, for example, illustrate the flow or operation of embodiments of the system 10 of the present invention. As will be understood by those skilled in the art, FIG. 4 illustrates a more general embodiment of the operation, and FIG. 5A and FIG. 5B illustrate a more detailed embodiment of the operation. The user interacts with the system 10 through a graphical user interface (GUI), which may feature varying screen views or front plan views displayed on a monitor of a computer. Some screen view images of an embodiment of the invention are illustrated in FIGS. 6-25. The particular features of the GUI screen views depend upon the relative phase of the process being used or implemented by a user.

As shown in FIG. 4, a more general embodiment of the invention is shown. The process starts with associating an instructional course with a teacher (see block 110). Then the system 10 creates a calendar schedule and assigns the instructional course to a date and time on the calendar schedule (see block 112). Then the system 10 assigns a lesson-plan 300 to the instructional course at the date and time on the calendar schedule (see block 114). Then the system 10 indicates on the calendar schedule whether the instructional course for the date and time on the calendar schedule has been assigned a completed lesson-plan 300 (see block 116).

As shown in FIG. 5A and FIG. 5B, a more detailed embodiment of the invention is shown. The process starts with establishing teachers as teaching predetermined courses at date and time during the term [see block 120]. Then the system 10 communicates the instructional term to the teacher [see block 122]. Then the system 10 creates an individual teacher profile [see block 124]. Then the system 10 associates an instructional course from the schedule with the teacher by assigning the course to a teacher profile [see block 126]. Then the system 10 creates a schedule depository and assigns an instructional course to a day of the week and time in the schedule depository. [see block 128] Then the system 10 creates a calendar schedule to assign the instructional course to the date and time on the calendar [see block 130]. Then the system 10 creates lesson-plans 300 for a teacher and an instructional course [see block 132]. Then the system 10 creates a lesson-plan depository an assigns lesson-plans 300 to the depository [see block 134]. Then the system 10 accesses teachers lesson-plans 300 from at least one school year [see block 136]. Then the system 10 creates sharing teachers from the share-network whereby sharing lesson-plans 300 through a communication network [see block 138]. Then the system 10 assigns a lesson-plan 300 to an instructional course at a date and time on the calendar [see block 140]. Then the system 10 indicates on the calendar schedule the date and time of the completed lesson-plan 300 [see block 142].

In general, the system 10 is responsive to commands from a teacher 40 through the communication network 25. A schedule is provided in the system 10 corresponding to dates and times within the calendar year. The teacher 40 inputs information into the system 10, which is received and stored by the system 10. The teacher 40 may be an educational teacher 40, administrator 42, or other individual. For simplicity, the term teacher 40 is used for all possible users of the system 10. An instructional course is assigned to the appropriate dates and times within the schedule in the system 10. Then lesson-plans 300 are assigned to the instructional course in the system 10 for the dates and times the instructional course appears in the schedule.

The teacher 40 can access the web site by entering the proper internet or intranet web site address, where the teacher 40 is then prompted to login via a username and password. After the teacher 40 has successfully logged onto the web site, the teacher 40 is directed to the homepage of the web site, as shown in FIG. 6. When the teacher 40 selects or clicks one of the toolbar icons 215 or web pages on the toolbar 210, the instruction blocks 21 of the computer program product 21 in the memory 19 instruct the system 10 to show the information relating to that particular icon 215 or web page on the graphical user interface.

The teacher 40 establishes a teacher profile 240 to utilize the organization and management system 10. The teacher profile 240 is used to associate a specific teacher 40 with the particular instructional courses the teacher 40 is teaching for a particular school year. The term "instructional course" comprises both the subject matter or content area 242 of the course, and the particular grade level 244 or level of difficulty for the course. After the teacher profile 240 is created, the teacher 40 is then able to enter instructional courses and lesson-plans 300 into a schedule.

To build the teacher profile 240 in the system 10, the teacher 40 selects a "My Profile" icon 224, as shown in FIG. 6, located on the navigation toolbar 210 on the opening page or homepage of the web site. As shown in FIG. 7, the database 17 contains preselected administrative information that is reflected in the "My Profile" web page, for example, from which the teacher 40 may select the content area 242 and grade level 244 for the instructional course. Also, for example, the teacher's 40 campus within the school district is pre-assigned and is displayed within the "My Profile" page. Also, for example, the teacher 40 may edit the preselected classroom number for the homeroom in which the teacher 40 teaches. An administrator 42 with the appropriate level of access rights may view the teacher's 40 "My Profile" page to identify the classroom where the teacher 40 is located. This menu is populated with preselected content areas 242 and grade levels 244, and the teacher 40 may select from a drop-down menu the content area 242 and grade level 244 for each of the instructional courses the teacher 40 is teaching.

The preselected contents list displayed from the drop-down box for both the subject matter content area 242 and grade level 244 of the instructional course can be maintained and managed by an administrator 42 such as a curriculum specialist. After selecting the desired content from the preselected content list, a number of grade level 244 choices that are specific to the content area 242 are made available for choosing by the teacher 40. When the teacher 40 is satisfied with the content area 242 and grade level 244 selections, the teacher 40 may add this instructional course selection to the teacher's 40 instructional courses list. After selecting the content area 242 and grade level 244 from the drop-down boxes, the teacher 40 selects "Add Course" and repeats the process until the teacher 40 has selected and added all the instructional courses taught by the teacher 40.

As shown in FIG. 7, the "My Profile" page also includes an optional feature of including the teacher 40 as a member of a share-network. The system 10 allows the teacher profile 240 to be added to a share-network to establish a specific group of share-network members who can share lesson-plans 300 with other members of the share-network. Membership with the share-network enables teachers 40 to share not only lesson-plans 300 from the current school year, but also lesson-plans 300 from previous school years as well. If the teacher 40 would like to share lesson-plans 300 with other teachers 40 having access to the system 10 through the communication network 25, the teacher 40 can click the "Join share-network" box within the "My Profile" page, after which the display changes to "share-network Member," indicating the teacher's 40 selection has been made successfully. The teacher 40 may change or modify the teacher profile 240 whenever necessary. In this manner, other teachers 40 belonging to the same share-network can view lesson-plan information and share information. In this manner, the system 10 creates a comprehensive network of information and knowledge throughout an entire network of teachers 40.

The share-network can be an individual school share-network of teachers 40 within an individual school, or a school share-network of teachers 40 within a particular campus of a school or school district, or a school district share-network of teachers 40 within an entire school district, or a city school share-network of teachers 40 in a particular city, or a county school share-network of teachers 40 in a particular county, or a statewide school share-network of teachers 40 in a particular state, or a nationwide school share-network of teachers 40 in a particular country.

After creating the teacher profile 240, the teacher 40 may then proceed to the subsequent steps of building a schedule, applying the schedule to dates and times on a calendar, and building and assigning lesson-plans 300 to each of the dates and times on the calendar schedule 250. The schedule may be built in the schedule depository 246 from the "Schedule Builder" icon 228 on the navigation toolbar 210, or directly on the calendar on a particular day from the "Calendar" icon 230 on the navigation toolbar 210. Similarly, lesson-plans 300 may be created in the lesson depository 262 from the "My Lessons" icon 232 on the navigation toolbar 210, or directly on the calendar on a particular day from the "Calendar" icon 230 on the navigation toolbar 210.

To begin building a schedule depository 246, the teacher 40 clicks the "Schedule Builder" icon 228 on the navigation toolbar 210. This presents the teacher 40 with a selection of days, for example Monday to Friday, as shown in FIG. 8. Alternatively, the days of the week could be Monday through Sunday. The teacher 40 selects a day from Monday through Friday, and then clicks on "Add Event" for that particular day. The schedule builder is flexible to allow for selection of individual days for those teachers 40 who teach a different curriculum on each day of the week. After clicking "Add Event", the teacher 40 types in the event description, which may be an instructional course, or alternatively another event such as a teacher 40 advisory period, on-duty period, study hall, lunch break, or planning period. The teacher 40 also types in the classroom location of the event or instructional course, along with any miscellaneous accommodations that may be necessary to properly teach or otherwise lead the event. It is particularly useful to note accommodations when children with special needs are involved in the selected instructional course. The teacher 40 also selects a start time and an end time for the event or instructional course. If the event is a particular instructional course that will require lesson-plans 300 to be assigned to a day and time, the teacher 40 should indicate this by selecting the "Lessons will be created for this event" box, after which the teacher 40 selects an instructional course from the preselected menu options of a drop-down box. Finally, the teacher 40 clicks "Add," and repeats the process for each of the days Monday through Friday, until the teacher 40 has fully completed building his daily or weekly schedule in the schedule depository 246. A completed schedule depository 246 illustrating Monday is shown in FIG. 8. The schedule depository 246 operates as a daily or weekly default schedule that may be applied throughout the dates of the years.

To expedite the process, after the teacher 40 has completed the schedule for one day, the teacher 40 can copy that same schedule for one day to another day by clicking on a "copy schedule" icon, as shown in FIG. 8, and then selecting the day to which the schedule should be copied. For example, if the teacher 40 has the same schedule for both Monday and Tuesday, the teacher 40 can click on the "copy schedule" icon when in the Monday schedule, and then select Tuesday as the day to which the same schedule should be applied in the schedule depository 246.

In order to apply the schedule to the calendar, the teacher 40 clicks on the "Calendar" icon 230 on the navigation toolbar 210. The calendar view illustrates a schedule showing the particular dates of the year in the calendar. After the teacher 40 has completed the schedule for all the days in the schedule depository 246, the teacher 40 can apply the schedule by applying the schedule depository 246 to a date or week in the calendar by accessing a particular date or week on the "Calendar" page and clicking on the "Apply Schedule" icon for that date or week, as shown in FIG. 9.

To apply the schedule to the calendar, the teacher 40 can apply the schedule to the calendar date-by-date or alternatively week-by-week. To apply the schedule date-by-date, the teacher 40 selects a date on the calendar, and may click on "Apply Schedule" for that date in order to automatically enter the daily schedule from the schedule depository 246. Alternatively, after selecting a date on the calendar, the teacher 40 may select "Add Calendar Event", and enter an event or instructional course directly on the calendar that may or may not be present in the schedule depository 246. To apply the schedule week-by-week, the teacher 40 selects a week on the calendar, and clicks on "Apply Schedule" for that week in order to automatically enter the weekly schedule from the schedule depository 246. The instructional courses or other events for those particular days in the schedule depository 246 will appear for the particular dates of the year on the calendar. When the teacher 40 desires to view the calendar schedule 250, the teacher 40 may view the schedule date-by-date as shown in FIG. 10, week-by-week as shown in FIG. 11, or by viewing six-week increments on the calendar, or in other alternative arrangements on the calendar.

The teacher 40 may change, modify, or delete the schedule on the calendar whenever necessary. If the teacher 40 makes an error applying the schedule to the calendar, or desires to modify the schedule on the calendar, the teacher 40 may click "Delete Schedule" to delete the schedule for a particular date as shown in FIG. 10, or may click "Delete Week Schedule and Lessons" to delete the schedule for a particular week as shown in FIG. 11.

Figure 10:
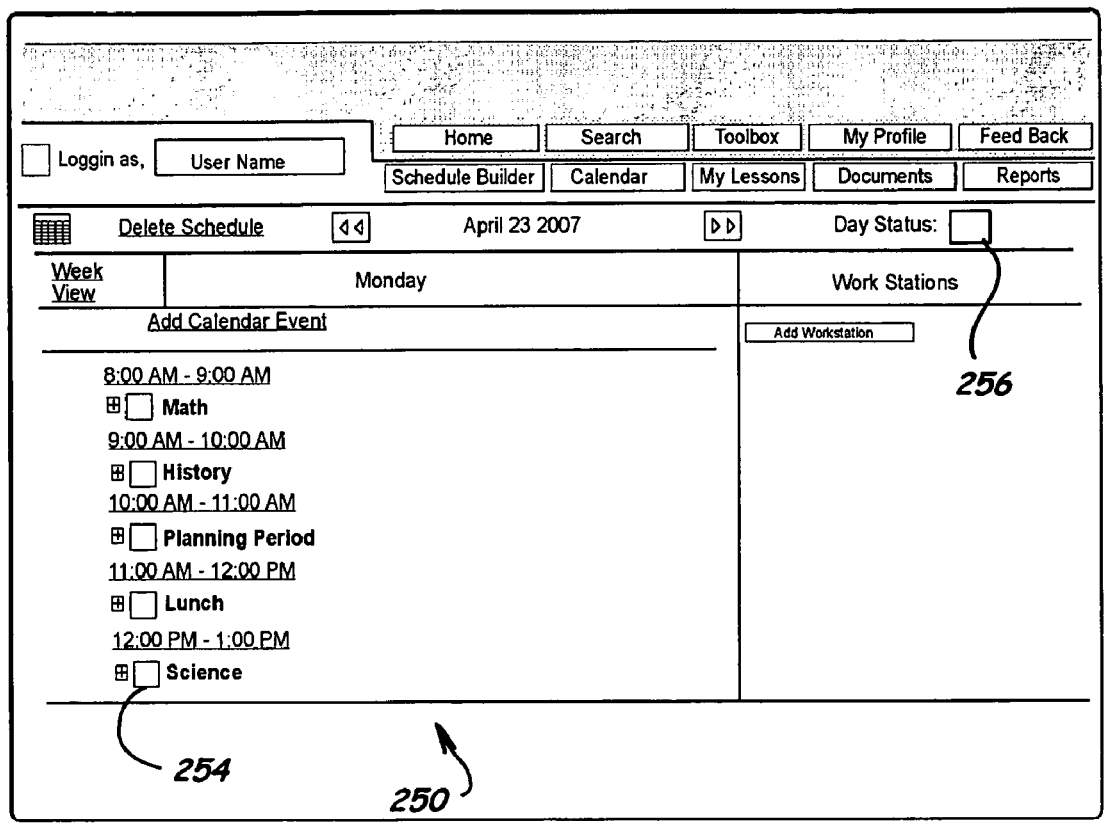
FIG. 10 is a screen view displaying a day view of a calendar schedule according to an embodiment of the present invention.

The teacher 40 may desire to add a computer student training workstation, such as to establish a computer corner training activity for students, as shown in FIGS. 10-11. To add a student training workstation, the teacher 40 clicks on the "Workstations" icon on the "Schedule Builder" pages and then the teacher 40 clicks on the "Add Workstation" icon. The teacher 40 can type a title and an activity for the student training workstation, and then clicks on "Add." To assign the student training workstation to the calendar, the teacher 40 clicks on the "Add Workstation" icon on the "Calendar" page. The teacher 40 may wish to assign lesson objectives to a student training workstation. To assign lesson objectives to a student training workstation, the teacher 40 clicks on the name of the student training workstation on the "Calendar" page. The teacher 40 then clicks on "Add Objectives," selects the objectives desired, and clicks on "Add to Workstation." The teacher 40 may also wish to copy an existing student training workstation to another week on the calendar. To do so, the teacher 40 clicks on the name of the student training workstation to be copied on the "Calendar" page. The teacher 40 clicks "Copy to another week," and selects a date to which the student training workstation will be copied. As a result, a copy of the student training workstation and its lesson objectives will be placed on that calendar week.

The teacher 40 can provide the administrator 42 of the system 10 with feedback information by clicking the "Feedback" icon 226 on the navigation toolbar 210. The feedback provided can relate to the improvement of topics such as, for example, the communication network 25, the instructional term curriculum schedule, the teacher profile 240, the schedule depository, the calendar schedule 250, the lesson-plans 300, the lesson-plan depository, the share-network, the importation of lesson-plans 300 from the share-network, the assignment of lesson-plans 300 to the calendar schedule 250, and the indication of completed lesson-plans 300 on the calendar schedule 250.

Figure 12:
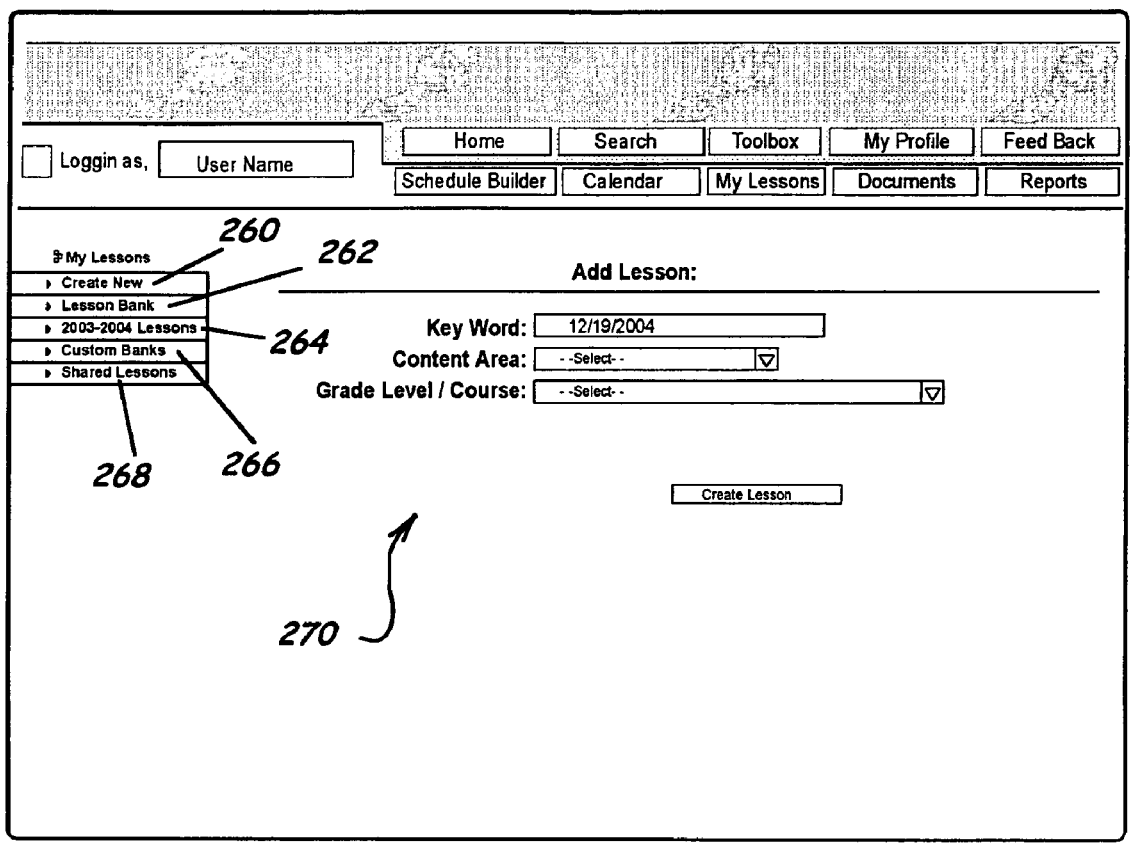
FIG. 12 is a screen view displaying a "Create New Lesson" page according to an embodiment of the present invention.
Figure 15:
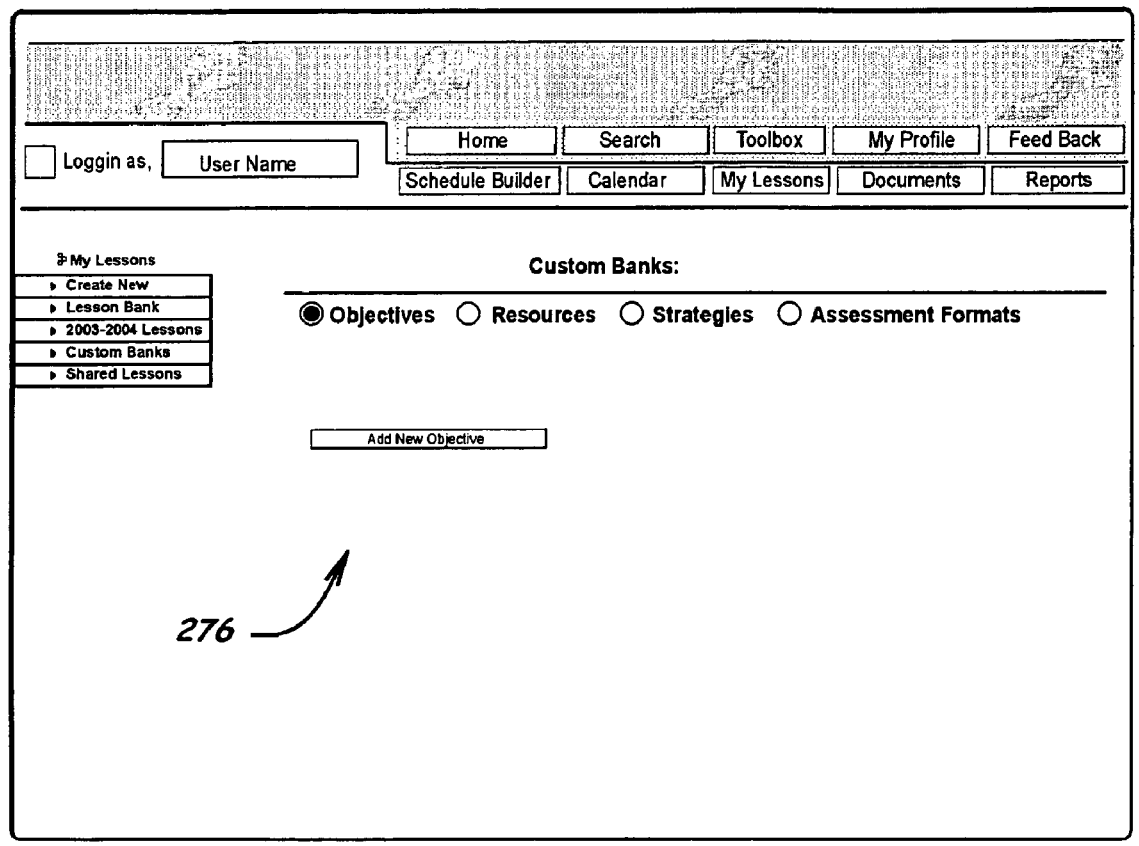
FIG. 15 is a screen view displaying a "Custom Banks" page according to an embodiment of the present invention.

After building the schedule and applying it to the calendar, the teacher 40 may wish to build lesson-plans 300 for each instructional course or other event on the schedule. Lesson-plans 300 can be created either by clicking on the "My Lessons" icon 232 or through the calendar schedule 250 by clicking on the "Calendar" icon 230. After clicking the "My Lessons" icon 232 on the navigation toolbar 210, or alternatively after clicking on the instructional course for a particular date and time on the calendar schedule 250 after clicking on the "Calendar" icon 230, the teacher 40 may select from several icons labeled Create New Lesson 260, Lesson Depository 262, Previous Year Lessons 264, Custom Banks 266, and Shared Lessons 268. In the Create New Lesson page 270, as shown in FIG. 12, the teacher 40 may create a new lesson-plan 300 for a particular instructional course. In the Lesson Bank page 272, as shown in FIG. 13, the teacher 40 can access, view, and assign lesson-plans 300 to the calendar schedule 250 for a particular course for the current school year that have yet to be assigned to the calendar schedule 250. In the Previous Year Lessons page 274, as shown in FIG. 14, the teacher 40 may access, view, and import a lesson-plan 300 for a particular instructional course for the previous school year. In the Custom Banks page 276, as shown in FIG. 15, the teacher 40 may create a customized description for an objective 280, resource 282, strategy 284, or assessment 286. The teacher 40 may then apply the custom objectives 280, custom resources 282, custom strategies 284, or custom assessments 286 to several other lesson-plans 300 as desired by the teacher 40. In the Shared Lessons page 278, as shown in FIG. 16, the teacher 40 may access, view, and import a particular lesson-plan 300 used by another teacher 40 on the share-network when the other teacher's 40 lesson-plans 300 are accessible from the share-network database 17.

Figure 17:
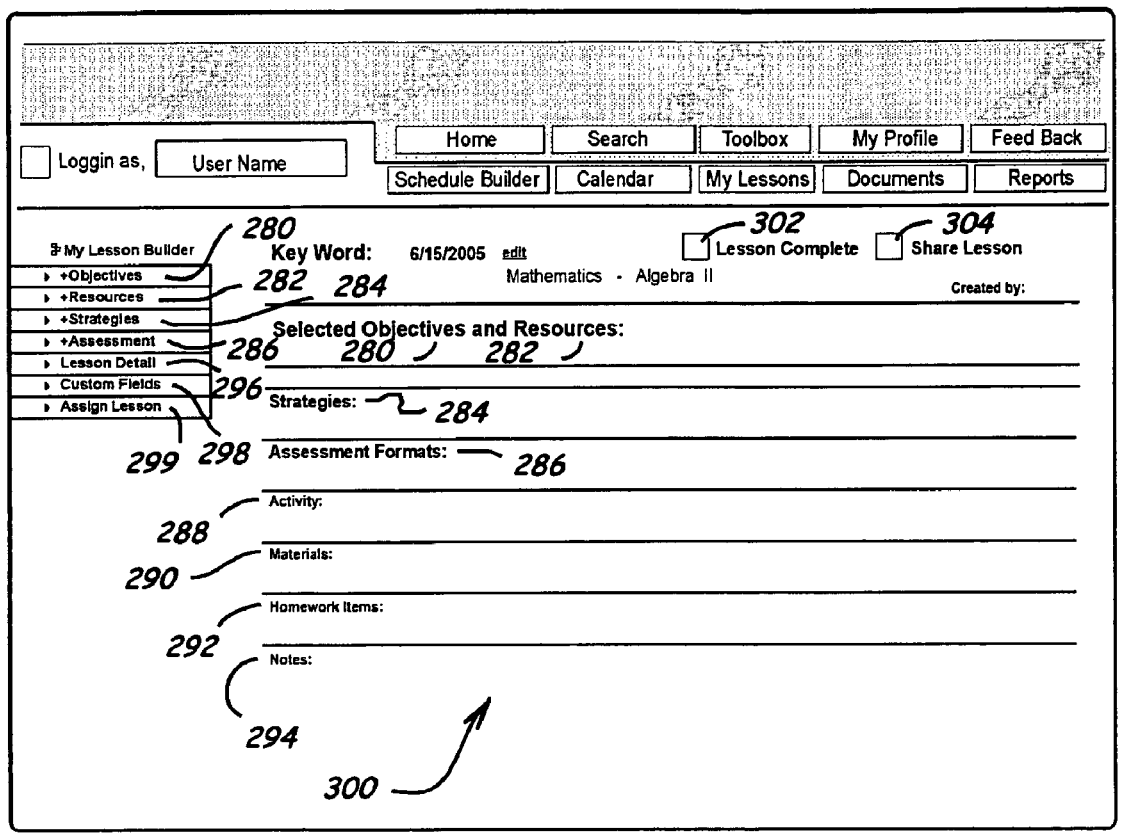
FIG. 17 is a screen view displaying a lesson-plan according to an embodiment of the present invention.
Figure 19:
FIG. 19 is a screen view displaying a particularized lesson objective according to an embodiment of the present invention.

When accessing the Create New Lesson page 270 and inputting the selected instructional course for which a new lesson-plan 300 is created, several fields within the lesson-plan 300 are required to be completed by the teacher 40 in order to properly build the lesson-plan 300. FIG. 17 shows a lesson-plan 300 form that has yet to be completed by the teacher 40. The required fields in the lesson-plan 300 are the lesson objectives 280, resources 282, strategies 284, assessments 286, and activities 288 fields.

Many of the objectives 280, resources 282, strategies 284, and assessments 286 are predetermined and entered into the system 10 as options for the teacher 40 to choose from when creating lesson-plans 300. The predetermined objectives 280, resources 282, strategies 284, and assessments 286 are described in sufficient detail for the teacher 40 when the teacher 40 inputs or selects from the predetermined options to complete the lesson-plan 300.

To enter a lesson objective 280 into the lesson-plan 300, the teacher 40 clicks the "Objectives" 280 icon and selects from a list of predetermined lesson objectives 280 for that particular instructional course, as shown in FIG. 18. The presentation of preselected lesson objectives 280 from which the teacher 40 may choose ensures that the school or school district is meeting appropriate federal, state, or local requirements. Each lesson objective 280 in the list describes a different objective 280 for the instructional course. The details for the particular objective 280 are shown, for example, in FIG. 19. The teacher 40 may view the details of the objective 280 before selecting it for the instructional course. After selecting each lesson objective 280 desired by the teacher 40, the teacher 40 clicks "Add to Lesson" to assign the lesson objective 280 to the lesson-plan 300 for the instructional course. The teacher 40 may also create customized lesson objectives 280 for the lesson-plan 300 by clicking on the "Custom Fields" icon 298, selecting "Objectives," describing the new lesson objective 280, and clicking "Apply."

When building a lesson-plan 300, the teacher 40 is able to view the number of times a particular objective 280 has been selected for a date and time on the calendar schedule 250, so that a teacher 40 can distinguish from those objectives 280 that have already been assigned to lesson-plans 300 from those objectives 280 that have not yet been assigned to lesson-plans 300. If the teacher 40 has previously selected an objective 280 for a lesson-plan 300, a number will appear next to that objective 280 showing the number of times that objective 280 has been assigned to a lesson-plan 300. The absence of a number next to the objective 280 indicates that the objective 280 has not yet been assigned to a lesson-plan 300.

To enter resources 282 into the lesson-plan 300, the teacher 40 clicks the "Resources" 282 icon and selects from a list of predetermined resources 282 for each particular lesson objective 280, as shown in FIG. 20. Each resource 282 from the list describes a different resource 282 for the lesson objective 280. In this manner, organizational knowledge is maximized as new teachers 40 or even experienced teachers 40 can quickly determine resources 282 available to meet the specific objective 280. After selecting each resource 282 desired by the teacher 40, the teacher 40 clicks "Add to Lesson" to assign the resource 282 to the lesson objective 280 in the lesson-plan 300. The teacher 40 may also create customized resources 282 for the lesson objective 280 by clicking on the "Custom Resource" icon 283 next to each lesson objective 280 and entering the resource 282 category, type, name, description of the resource 282, and clicking "Apply."

To enter a strategy 284 into the lesson-plan 300, the teacher 40 clicks the "Strategies" 284 icon and selects from a list of predetermined strategies 284 for that particular instructional course, as shown in FIG. 21. Each strategy 284 in the list describes a different technique for teaching the instructional course. After selecting each strategy 284 desired by the teacher 40, the teacher 40 clicks "Add to Lesson" to assign the strategy 284 to the lesson-plan 300 for the instructional course. The teacher 40 may also create customized strategies 284 for the lesson-plan 300 by clicking on the "Custom Fields" icon 298, selecting "Strategies," describing the new strategy 284, and clicking "Apply."

To enter an assessment 286 into the lesson-plan 300, the teacher 40 clicks the "Assessments" 286 icon and selects from a list of predetermined assessments 286 for that particular instructional course, as shown in FIG. 22. Each assessment 286 in the list describes a different evaluation method for the instructional course, varying from the traditional testing type of assessment 286 to more objective assessment methods. After selecting the assessment type desired by the teacher 40, the teacher 40 types in the substantive content of the description by the teacher 40 of that assessment. The teacher 40 clicks "Add to Lesson" to assign the assessment to the lesson-plan 300 for the instructional course. The teacher 40 may also create customized assessments 286 for the lesson-plan 300 by clicking on the "Custom Fields" icon 298, selecting "Assessments," describing the new assessment 286, and clicking "Apply."

The final required field, for example in this exemplary embodiment, is the activities 288 field. To enter an activity 288 into the lesson-plan 300, the teacher 40 clicks the "Lesson Detail" icon 296, and types the description of the activity 288 to be followed during the lesson into the activity 288 field, as shown in FIG. 23. The teacher 40 clicks "Apply" to assign the activity 288 to the lesson-plan 300 for the instructional course. Many other topics may optionally be added to the lesson-plan 300, such as instructional materials 290, homework 292, and notes 294, also shown in FIG. 23. To enter any of these topics into the lesson-plan 300, the teacher 40 clicks the "Lesson Detail" icon 296, and types the description of the optional topic into the topic field. The teacher 40 clicks "Apply" to assign the optional topic to the lesson-plan 300 for the instructional course.

To remove or delete one of the lesson objections, resources 282, strategies 284, or assignments 286 from the lesson-plan 300, the teacher 40 may click the "Remove" icon 285 next to the respective lesson objectives 280, resources 282, strategies 284, or assignments to be removed or deleted.

Before the lesson-plan 300 is completed, the teacher 40 must enter a unique keyword 306 from which to reference the lesson-plan 300. The teacher 40 can edit the default keyword 306 by clicking on the "Edit" link next to the default keyword 306 typing in the new keyword 306, and clicking "Apply". After all topics for the lesson-plan 300 have been completed, the teacher 40 clicks on the "Lesson Complete" box 302 to establish that the lesson is complete. If the teacher 40 wishes to share the completed lesson-plan 300 with other teachers 40 having access to the share-network database 17 through the communication network 25, the teacher 40 clicks on the "Share Lesson" box 304 before finalizing the lesson-plan 300. An exemplary embodiment of a completed lesson plan is illustrated in FIG. 24.

After the lesson-plan 300 has been fully completed, the teacher 40 may either store the lesson-plan 300 in the lesson bank 262 or alternatively assign the lesson-plan 300 to one or more dates and times for an instructional course on the calendar schedule 250. The default option is storage in the lesson bank 262, so the lesson-plan 300 automatically saves into the lesson bank 262 during or after completion of the lesson-plan 300. To remove the lesson-plan 300 from the lesson bank 262 and assign the lesson-plan 300 to the calendar schedule 250, the teacher 40 assigns the lesson-plan 300 by clicking on the "Assign Lesson" icon 299 and then assigning the lesson-plan 300 to each date and time on the calendar schedule 250 for which that particular lesson-plan 300 will be utilized for the instructional course, and then clicking "Apply." After this process is fully completed, the color-coded-indicator 254 on the "Calendar" page should change colors to indicate the successful assignment of the lesson-plan 300 to the dates of the year on the calendar schedule 250.

Lesson-plans 300 remain in the lesson bank 262 until assigned to an instructional course on the calendar schedule 250. The teacher 40 can edit or delete any lesson-plan 300 in the lesson bank 262 to reflect new or changed information at any time. Also, the teacher 40 at any time can assign any lesson-plan 300 in the lesson bank 262 to dates and times of instructional courses on the calendar schedule 250. By maintaining a centralized and permanent record of lesson-plans 300, the lesson bank 262 facilitates more efficient creation of future lessons by teachers 40. It also acts to allow institutional knowledge sharing and it acts as a historical database 17 showing exactly what curriculum was actually taught.

Within the "Lesson Bank" 262 page, as shown in FIG. 25, it is possible to assign a completed lesson-plan 300 from the lesson bank 262 to a particular date and time on the calendar schedule 250. To remove the lesson-plan 300 from the lesson bank 262 and assign the lesson-plan 300 to the calendar schedule 250, the teacher 40 first selects the applicable instructional course from the "Lesson Bank" 262 page and clicks "Get Lessons" to retrieve all of the lessons remaining in the lesson bank 262 for that instructional course. Alternatively, if the teacher 40 knows specifically which lesson-plan 300 to draw from the lesson bank 262, the teacher 40 can simply enter the keyword for the lesson-plan 300 and click "Get Lessons" to retrieve that particular lesson-plan 300. Another alternative is to simply leave the keyword entry blank and leave the instructional course entry unselected, and upon clicking "Get Lessons" to retrieve the lesson-plans 300, all lesson-plans 300 for all instructional courses in the lesson bank 262 are displayed for the teacher 40.

When the lesson-plan 300(*s*) are displayed, the teacher 40 assigns the lesson-plan 300 by clicking on the "Assign Lesson" icon on the "Lesson bank" page, and then assigning the lesson-plan 300 to each date and time on the calendar schedule 250 for which that particular lesson-plan 300 will be utilized for the instructional course, and then clicking "Apply." Once the lesson-plan 300 has been assigned to the calendar schedule 250, the lesson-plan 300 is removed from the lesson bank 262.

After a lesson-plan 300 is assigned to a date and time on the calendar schedule 250, it is possible to unassign or move the lesson-plan 300 from one date and time on the calendar schedule 250 to another date and time on the calendar schedule 250. From the calendar schedule 250, the teacher 40 clicks on the keyword for the lesson-plan 300 as it is displayed on the calendar schedule 250, which then displays the lesson-plan 300. The teacher 40 clicks on the "Assign Lesson" icon, and can unselect or remove the lesson-plan 300 from one date and time and select or assign the lesson-plan 300 to another date and time on the calendar schedule 250, and then clicks "Apply."

Referring to FIGS. 10-11, the calendar may contain a Course Status Indicator 254, of which in this embodiment three separate color indication systems exist. One color-status indicator 254 is in the form of a color-coded bar beside each instructional course assigned to a date and time on the calendar schedule 250 to indicate whether or not the supporting lesson-plan 300 for that date of the year on the calendar has been completed and applied to the calendar schedule 250. In similar style, the calendar also may optionally contain a color-coded Day Status Indicator 256 and Week Status Indicator 258 that indicate whether all lesson-plans 300 for that day or week of the calendar have been completed and applied to the calendar schedule 250. Typically, red indicates that no lesson-plan 300 has been completed, and green indicates that a lesson-plan 300 has been completed. This reminds the teacher 40 which lesson-plans 300 for which instructional courses on which dates need to be completed. Similarly, it allows an administrator 42 to review schedules in a time-efficient manner. Lesson-plans 300 must be completed and associated to an instructional course or other event on all of the instructional courses on the calendar in order for the color-coding indicators 254 on the calendar to indicate that the schedule is complete.

It is possible for the teacher 40 to delete, unassign, change, and modify the lesson-plans 300 applied to the calendar schedule 250. To delete the lesson-plan 300, the teacher 40 clicks on the "Calendar" page and locates the lesson to be deleted. Then the teacher 40 clicks on an "x" symbol adjacent to the keyword of the lesson-plan 300 to be deleted. This not only removes the lesson-plan 300 from the calendar schedule 250, but also completely deletes the lesson-plan 300 from the database 17.

The teacher 40 has the option to "unassign" the lesson-plan 300 from the calendar schedule 250, which removes the lesson-plan 300 from the calendar schedule 250, but does not entirely delete the lesson-plan 300 from the database 17. When the teacher 40 unassigns a lesson-plan 300, the teacher 40 effectively returns the lesson-plan 300 to the lesson bank 262. To unassign the lesson-plan 300, the teacher 40 clicks on the "Calendar" page and locates the lesson to be unassigned. Then the teacher 40 clicks on the keyword of the lesson to be unassigned, after which the lesson-plan 300 page appears. The teacher 40 then clicks on the "Assign Lesson," icon, unchecks the box for each date and time on the calendar schedule 250 for which the teacher 40 desires to unassign the lesson-plan 300, and clicks "Apply."

Each time the teacher 40 unassigns a lesson-plan 300, the lesson-plan 300 returns to the lesson bank 262, even if the exact same lesson-plan 300 is being unassigned for several dates and times on the calendar schedule 250. As such, when unassigning a particular lesson-plan 300 existing on more than one date and time in the calendar schedule 250, the teacher 40 should unassign only one appearance of the lesson-plan 300 for a single date and time in the calendar schedule 250. Then the teacher 40 should use the delete function to remove all the other exact same lesson-plan 300 appearances on the calendar schedule 250. This will prevent several appearances of the same exact lesson-plan 300 from returning to the lesson bank 262.

To modify a lesson-plan 300, the teacher 40 clicks on the "Calendar" page and locates the lesson to be modified. Then the teacher 40 clicks on the keyword of the lesson to be modified, after which the lesson-plan 300 page appears. The teacher 40 then clicks on the particular topic the teacher 40 wishes to modify, such as "Objectives" 280, "Resources" 282, "Strategies" 284, "Assessments" 286, or "Lesson Detail" 296. The teacher 40 modifies the appropriate content for the selected topic of the lesson-plan 300, and clicks "Apply."

To view a lesson-plan 300 from the calendar schedule 250, the teacher 40 clicks on the "Calendar" page and locates the lesson-plan 300 to be viewed. Then the teacher 40 clicks on the "View" link adjacent to the keyword of the lesson-plan 300 to be viewed. Individual lesson-plans 300 can be printed directly from the lesson view page. If the teacher 40 desires to print the lesson-plan 300, the teacher 40 utilizes the Windows Print function from a computer to print the lesson-plan 300 shown on the lesson view page. After a number of lesson-plans 300 are created and assigned to dates and times for instructional courses on the calendar schedule 250, the teacher 40 can electronically submit the lesson-plan 300 to an administrator 42.

Referring to FIG. 12 and FIG. 16, the teacher 40 may also import lesson-plans 300 from the "My Lessons" page. To import lesson-plans 300 from other teachers 40 on the share-network, the teacher 40 clicks the "Shared Lessons" icon 268 to enter the "Shared Lessons" page 278. Then the teacher 40 selects the particular teacher 40 and school year of the desired lesson-plan 300 to be imported, after which all lesson-plans 300 available for import will appear. The teacher 40 selects the check-box adjacent to each lesson the teacher 40 desires to import, and clicks "Apply." The imported lessons are accessible through the teacher's 40 lesson bank 262 within the "My Lessons" page and are thus available for assigning to dates and times on the teacher's 40 calendar schedule 250.

In another embodiment of the invention, another method of importing lessons from other teachers 40 having access to the share-network database 17 through the communication network 25 involves the teacher 40 clicking on the "Calendar" page of the share-network and locating the lesson-plan 300 to be viewed. Then the teacher 40 clicks on the "View" link adjacent to the keyword of the lesson-plan 300 to be viewed.

From the lesson-plan 300 the teacher 40 selects "Shared Lessons," and selects the particular lesson-plan 300 the teacher 40 desires to import.

Referring to FIG. 10 and FIG. 14, the teacher may also import the teacher's 40 own lesson-plans 300 from previous years. To import previous years lesson-plans 300, the teacher 40 clicks the "Previous Years Lessons" icon 264 to enter the "Previous Years Lessons" page 274. Then the teacher 40 selects the particular instructional course and school year of the desired lesson-plan 300 to be imported, after which all lessons available for import will appear. The teacher 40 selects the check-box adjacent to each lesson the teacher 40 desires to import, and clicks "Apply." The imported lessons are accessible through the teacher's 40 lesson bank 262 within the "My Lessons" page and are thus available for assigning to dates and times on the teacher's 40 calendar schedule 250.

The organization and management system 10 includes several other features that enhance the operation. Clicking on a search icon 220 from the navigation toolbar 210 enables the teacher 40 to search the database 17 for instructional courses, lesson-plans 300, lesson objectives 280, resources 282, and other information. Clicking on a feedback icon 226 from the navigation toolbar 210 enables the teacher 40 to report feedback information to improve the system 10 or offer other recommendations. The system 10 also includes a reports feature that provides recent announcements from the educational institution by clicking on the reports icon 236. The system 10 also allows the educational institution to place informational documents onto the database 17 that are to be viewed by the teachers 40 or administrators 42 by accessing the informational documents through the communication network 25 by clicking on the documents 234 icon. The informational documents may be reports, grading and reporting handbooks, discipline management plans, campus improvement plans, or other such documents. Because the system 10 is to be used within the educational institution, teachers 40 and administrators 42 would have access to the database 17, but parents of the children being taught would not have access to the database 17.

As illustrated in FIGS. 1-4, FIG. 5A and FIG. 5B, and as described herein, embodiments of the present invention include a system 10 to enhance organization and management of lesson-plans 300, including a computer defining a server 15 and having a database 17 and memory 119 associated therewith and interfaced with a communication network 25, an administrative computer 35 adapted to remotely interface with the communication network 25 and a user 42, several client computers 30 adapted to remotely interface with the communication network 25 and a user 40, and a computer program product 21 stored in the memory of the server 15 adapted to remotely interface with communication network 25. An embodiment of a computer program product 21, for example, includes an instructional term curriculum scheduler [see block 60], a communicator [see block 62], a profiler [see block 64], an instructional course associator [see block 66], a schedule storer [see block 68], a calendar scheduler [see block 70], a lesson-plan creator [see block 72], a lesson-plan storer [see block 74], a lesson-plan accessor [see block 76], a share-network creator [see block 78], a lesson-plan assigner [see block 80], and a lesson-plan indicator [see block 82].

The computer program product 21 can also advantageously include an objectives storer responsive to several predetermined objectives 280 and user input commands which create an objectives depository to store the objectives 280 and from which the objectives 280 are assigned to one of the lesson-plans 300, and an objectives indicator responsive to the objectives depository and user input commands to indicate whether the objectives have been assigned to a lesson-plan 300.

The computer program product 21 can also advantageously include a schedule depository responsive to user input commands which copies the instructional courses from one day of the schedule depository onto another day of the schedule depository, and depository assignment instructions responsive to the schedule depository and user input commands which assigns data from one day of the schedule depository to a date and time on the calendar schedule 250 for display on the calendar schedule 250 and which assigns data from one week of the schedule depository to one week of dates and times on the calendar schedule for display on the calendar schedule.

The computer program product 21 can also advantageously include a share-network including an individual school share-network, a school share-network, a school district share-network, a school city share-network, a school county share-network, a statewide share-network, and a nationwide share-network.

The computer program product 21 can also advantageously include a lesson-plan 300 including one or more topics selected from the group including objectives 280, resources 282, strategies 284, assessments 286, activities 288, instructional tools 290, and homework assignments 292.

The computer program product 21 can also advantageously include a lesson-plan indicator which indicates on the calendar schedule 250 whether several instructional courses for a particular date on the calendar schedule 250 have been assigned a completed lesson-plan 300, indicates whether several instructional courses for a particular week on the calendar schedule 250 have been assigned a completed lesson-plan 300, and indicates on the calendar schedule 250 by using a color-coded indicator 254 communicated to the user through the communication network 25.

The computer program product 21 can also advantageously include a program product 21 including feedback instructions to provide an administrator 42 of the system with feedback information relating to improvement of a topic selected from the group including the communication network 25, the instructional term curriculum schedule, the teacher profile 240, the schedule depository 246, the calendar schedule 250, the lesson-plans 300, the lesson-plan depository, the share-network, the importation of lesson-plans 300 from the share-network, the assignment of lesson-plans 300 to the calendar schedule 250, and the indication of completed lesson-plans 300 on the calendar schedule 250.

As illustrated in FIGS. 1-4, FIG. 5A and FIG. 5B, and as described herein, embodiments of the present invention also include a computer program product 21 embodied in a computer-readable medium 19 to enhance organization and management of lesson-plans. An embodiment of a computer program product 21, for example, includes an instructional course associator [see block 50], a calendar scheduler [see block 52], a lesson-plan assigner [see block 54], and a lesson-plan indicator [see block 56].

The computer program product 21 can also advantageously include an instructional term curriculum schedule instructions responsive to administrative user 42 input commands establishing several teachers 40 as teaching several predetermined instructional courses at several predetermined dates and times during a future instructional term on an instructional term curriculum schedule for the future instructional term, communication instructions responsive to the instructional term curriculum schedule communicating the instructional term curriculum schedule to each of the several teachers 40, profile instructions responsive to the instructional term curriculum schedule creating an individual teacher profile 240 for each of the several teachers 40 and wherein the instructional course instructions further comprise instructions to associate one of several predetermined instructional courses from the instructional term curriculum schedule with one of the several teachers 240 by assigning the predetermined instructional course to one of the several teachers 240, schedule storage instructions responsive to the instructional term curriculum schedule and the teacher profile 240 and user input commands to create a schedule depository 246 and to assign the predetermined instructional course to a day of the week and time in the schedule depository 246 for storage in the schedule depository 246 and wherein the calendar instructions further comprise instructions to create a calendar schedule 250 and to assign the predetermined instructional course to the predetermined date and time on the calendar schedule 250 for display on the calendar schedule 250, lesson-plan storage instructions responsive to the lesson-plans 300 and user input commands to create a lesson-plan depository 262 and to assign the lesson-plans 300 to the lesson-plan depository 262 for storage, lesson-plan 300 access instructions responsive to user input commands to access one of the teacher's 40 lesson-plans 300 from one of several school years, share-network instructions responsive to user input commands to create several sharing teachers 40 from the several teachers on a share-network, import instructions responsive to the share-network and user input commands, and to import the shared lesson-plans 300 through the communication network 25 from one participating teacher on the share-network to another participating teacher on the share-network wherein the lesson-plan assignment instructions further include instructions to assign one of the lesson-plans 300 to the instructional course at the date and time on the calendar schedule 250.

The computer program product 21 can also advantageously include an objectives storer responsive to several predetermined objectives and user input commands to create an objectives depository to store the objectives 280 and from which the objectives 280 are assigned to one of the lesson-plans 300, and an objectives indicator responsive to the objectives depository and user input commands to indicate whether the objectives 280 have been assigned to a lesson-plan 300.

The computer program product 21 can also advantageously include a schedule depository 246 responsive to user input commands to copy the instructional courses from one day of the schedule depository 246 onto another day of the schedule depository 246, and depository assignment instructions responsive to the schedule depository 246 and user input commands to assign data from one day of the schedule depository 246 to a date and time on the calendar schedule 250 for display on the calendar schedule 250 and to assign data from one week of the schedule depository 246 to one week of dates and times on the calendar schedule 250 for display on the calendar schedule 250.

The computer program product 21 can also advantageously include a lesson-plan indicator which further indicates on the calendar schedule 250 whether all the several instructional courses for a particular date on the calendar schedule 250 have been assigned a completed lesson-plan 300 and further indicate on the calendar schedule 250 whether all the several instructional courses for a particular week on the calendar schedule 250 have been assigned a completed lesson-plan 300 and further indicate on the calendar schedule 250 by using a color-coded indicator 254 communicated to the user through the communication network 25.

The computer program product 21 can also advantageously include feedback instructions to provide an administrator 42 of the system 10 with feedback information relating to improvement of a topic selected from the group consisting of the communication network 25, the instructional term curriculum schedule, the teacher profile 240, the schedule depository 246, the calendar schedule 250, the lesson-plans 300, the lesson-plan depository, the share-network, the importation of lesson-plans 300 from the share-network, the assignment of lesson-plans 300 to the calendar schedule 250, and the indication of completed lesson-plans 300 on the calendar schedule 250.

As illustrated in FIGS. 1-4, FIG. 5A and FIG. 5B, and as described herein, embodiments of the present invention also include a method to enhance organization and management of lesson-plans 300 including associating one of several instructional courses with one of several teachers 40, creating a calendar schedule 250 and assigning the instructional courses to a date and time on the calendar schedule 250 for display, assigning one of several lesson-plans 300 to the instructional course at the date and time on the calendar schedule 250, and indicating on the calendar schedule 250 whether the instructional course for the date and time on the calendar schedule 250 has been assigned a completed lesson-plan 300.

As illustrated in FIGS. 1-4, FIG. 5A and FIG. 5B, and as described herein, embodiments of the present invention also include establishing several teachers 40 as teaching several predetermined instructional courses at a plurality of predetermined dates and times during a future instructional term on an instructional term curriculum schedule for the future instructional term. An embodiment of the present invention, for example, includes communicating the instructional term curriculum schedule to each of the several teachers 40, creating an individual teacher profile 240 for each of the several teachers 40, associating one of the several predetermined instructional courses from the instructional term curriculum schedule with one of the several teachers 40 by assigning the predetermined instructional course to one of the several teacher profiles 240, creating a schedule depository 246 and assigning the predetermined instructional course to a day of the week and time in the schedule depository 246 for storage in the schedule depository 246, creating a lesson-plan depository 262 and assigning the lesson-plans 300 to the lesson-plan depository 262 for storage in the lesson-plan depository 262, accessing one of the teacher's 40 lesson-plans 300 from one of a plurality of school years, creating several sharing teachers from several teachers 40 on a share-network from shared lesson-plans 300 from one of several school years to share with other sharing teachers through the communication network 25, and importing the shared lesson-plans 300 through the communication network 25 from one participating teacher on the share-network to another participating teacher on the share-network.

The method can also advantageously include creating an objectives depository to store the objectives 280 and from which the objectives 280 are assigned to one of the lesson-plans 300, and indicating whether the objectives 280 have been assigned to a lesson-plan 300.

The method can also advantageously include copying the instructional courses from one day of the schedule depository 246 onto another day of the schedule depository 246 and assigning data from one day of the schedule depository 246 to a date and time on the calendar schedule 250 for display on the calendar schedule 250 and assigning data from one week of the schedule depository 246 to one week of dates and times on the calendar schedule 250 for display on the calendar schedule 250.

The method can also advantageously include indicating on the calendar schedule 250 whether all the several instructional courses for a particular date on the calendar schedule 250 have been assigned a completed lesson-plan 300 and indicating on the calendar schedule 250 whether all the several instructional courses for a particular week on the calendar schedule 250 have been assigned a completed lesson-plan 300 and indicating on the calendar schedule 250 by using a color-coded indicator 254 communicated to the user through the communication network 25.

The method can also advantageously include providing an administrator 42 of the system 10 with feedback information relating to improvement of a topic selected from the group including the communication network 25, the instructional term curriculum schedule, the teacher profile 240, the schedule depository 246, the calendar schedule 250, the lesson-plans 300, the lesson-plan depository, the share-network, the importation of lesson-plans 300 from the share-network, the assignment of lesson-plans 300 to the calendar schedule 250, and the indication of completed lesson-plans 300 on the calendar schedule 250.

Still further embodiments of the present invention can include a computer-readable medium 19 that is readable by a computer, the computer-readable medium 19 containing a set of computer-executable instructions that when executed by the computer cause the computer to perform the following operations: associating one of a plurality of instructional courses with one of a plurality of teachers 40, creating a calendar schedule 250 and assigning the instructional course to a date and time on the calendar schedule 250 for display on the calendar schedule 250, assigning one of several lesson-plans 300 to the instructional course at the date and time on the calendar schedule 250, and indicating on the calendar schedule 250 whether the instructional course for the date and time on the calendar schedule 250 has been assigned a completed lesson-plan 300.

An embodiment of a computer-readable medium 19 can further include the computer-executable instructions that cause the computer to perform the following operations: establishing several teachers 40 as teaching several predetermined instructional courses a several predetermined dates and times during a future instructional term on an instructional term curriculum schedule for the future instructional term, communicating the instructional term curriculum schedule to each of several teachers 40, creating an individual teacher profile 240 for each of several teachers 40, associating one of several predetermined instructional courses from the instructional term curriculum schedule with one of several teachers 40 by assigning the predetermined instructional course to one of several teacher profiles 240, creating a schedule depository 246 and assigning the predetermined instructional course to a day of the week and time in the schedule depository 246 for storage in the schedule depository 246, creating a lesson-plan depository 262 and assigning the lesson-plans 300 to the lesson-plan depository 262 for storage in the lesson-plan depository 262, accessing one of the teacher's 40 lesson-plans 300 from one of several school years, creating several sharing teachers from several teachers 40 on a share-network that have a plurality of shared-lesson-plans 300 from one of several school years in order to share with other sharing teachers through the communication network 25, and importing the shared lesson-plans 300 through the communication network 25 from one participating teacher on the share-network to another participating teacher on the share-network.

An embodiment of a computer-readable medium 19 can further include computer-executable instructions that cause the computer to create an objectives depository to store the objectives 280 and from which the objectives 280 are assigned to one of the lesson-plans 300 and indicate whether the objectives 280 have been assigned to a lesson-plan 300.

An embodiment of a computer-readable medium 19 can further include copying the instructional courses from one day of the schedule depository 246 onto another day of the schedule depository 246 and assigning data from one day of the schedule depository 246 to a date and time on the calendar schedule 250 for display on the calendar schedule 250 and assigning data from one week of the schedule depository 246 to one week of dates and times for display on the calendar schedule 250.

An embodiment of a computer-readable medium 19 can further include indicating on the calendar schedule 250 whether all the several instructional courses for a particular date on the calendar schedule 250 have been assigned a completed lesson-plan 300, indicating on the calendar schedule 250 whether all the several instructional courses for a particular week have been assigned a completed lesson-plan 300, and indicating on the calendar schedule 250 by using a color-coded indicator 254 communicated to the user through the communication network 25.

An embodiment of a computer-readable medium 19 can further include providing an administrator 42 of the system 10 with feedback information relating to improvement of a topic selected from the group consisting of the communication network 25, the instructional term curriculum schedule, the teacher profile 240, the schedule depository 246, the calendar schedule 250, the lesson-plans 300, the lesson-plan depository 262, the share-network, the importation of lesson-plans 300 from the share-network, the assignment of lesson-plans 300 to the calendar schedule, and the indication of completed lesson-plans 300 on the calendar schedule 250.

The organization and management system 10 offers important advantages. The system 10 preserves physical space in the educational facility that previously has been used for storing boxes of notebooks and file cabinets of instructional files. The educational institution can then utilize this physical space more resourcefully. Further, the system 10 provides a more efficient and graceful means of organizing, managing, and distributing calendar schedules 250 of lesson-plans 300 and lesson objectives 280 to administrators 42 and teachers 40 working at the educational institution. It allows for unobtrusive supervision by the administrators 42 and assurances that federal, state, and/or local educational requirements are being met.

In the drawings and specification, there have been disclosed embodiments of the present invention, and although specific terms are employed, the terms are used in a descriptive sense only and not for purposes of limitation, the scope of the invention being set forth in the following claims. The invention has been described in considerable detail with specific reference to the illustrated embodiments. It will be apparent, however, that various modifications and changes can be made within the spirit and scope of the invention as described in the foregoing specification.

That claimed is:

1. A system to manage and organize teacher class schedules and lesson plans for an educational institution, the system comprising:

a first computer associated with an educational institution to define an educational institution computer, the educational institution computer adapted to communicate via a communication network with a second computer associated with an administrator to define an administrative computer, the administrative computer positioned remote from the educational institution computer and configured to designate a plurality of instructional courses to be taught during a future instructional term to define a plurality of predetermined instructional courses, the educational institution computer further adapted to communicate with a plurality of third computers associated with a plurality of teachers to define a plurality of teacher computers, each of the plurality of teacher computers positioned remote from the educational institution computer and the administrative computer;

one or more databases accessible by the administrative computer, the one or more databases having listed therein names of the plurality of teachers to teach during the future instructional term and a lesson plan depository having stored therein a plurality of lesson plans associated with the educational institution for a plurality of school terms;

one or more non-transitory computer readable memories having computer program stored therein, the computer program operable on the educational institution computer and comprising a set of instructions that when executed by the educational institution computer cause the educational institution computer to perform a process of assigning the plurality of teachers to scheduling requirements for the educational institution, the computer program comprising:

an instructional course associator module to establish the plurality of teachers at the educational institution to teach the plurality of predetermined instructional courses, the instructional course associator module comprising the instructions of:

establishing, by the educational institution computer responsive to receiving user input commands from the administrative computer, each of the plurality of teachers at the educational institution as teaching one or more of the plurality of predetermined instructional courses to be taught during substantially all the future instructional term to thereby set an instructional term curriculum schedule;

retrieving data from the one or more databases to populate one or more sections of a plurality of teacher profiles including name of the teacher, one or more classroom locations, and institutional term, each of the plurality of teacher profiles being stored in the one or more databases and associated with one of the plurality of teachers;

communicating, via the communication network, the instructional term curriculum schedule to each of the plurality of teacher computers responsive to the establishing step; and assigning each one of the plurality of predetermined instructional courses from the instructional term curriculum schedule with one of the plurality of teacher profiles to thereby create a schedule depository, the schedule depository having one or more fields indicating days of a week and a plurality of times during the days of the week;

a calendar scheduler module to build a teaching calendar schedule for each of the plurality of teachers, the calendar scheduler module comprising the instructions of:

assigning each one of the plurality of predetermined instructional courses to one or more days and a time of the one or more days in the schedule depository to thereby build the teaching calendar schedule for each of the plurality of teachers, the schedule depository further having each of teaching calendar schedules;

a lesson plan module to assign the plurality of lesson plans to a respective one or more of the plurality of teacher profiles, the lesson plan module comprising the instructions of:

creating a share network comprising a plurality of sharing teachers from the plurality of teachers, each one of the sharing teachers allowing another of the plurality of sharing teachers to access each one of the sharing teacher's lesson-plans from each one of the plurality of school terms stored in the lesson plan depository;

creating one or more lesson plans for one or more of the plurality of predetermined instructional courses for one or more days and one or more times in the schedule depository, each of the one or more lesson plans being stored in the lesson plan depository on the one or more databases;

assigning one or more of the plurality of lesson plans stored in the lesson plan depository to one or more of the plurality of predetermined instructional courses, one or more days, and a time of the one or more days on one or more of the teaching calendar schedules, the one or more of the plurality of lesson plans to be implemented by one or more of the plurality of teachers; and a status indicator module to indicate on each of the teaching calendar schedule whether one or more of the plurality of predetermined instructional courses for a date and time on the teaching calendar schedules have been assigned one or more lesson plans, the status indicator module comprising the instructions of:

indicating on each of the teaching calendar schedules for each of the plurality of teachers whether one or more of the plurality of predetermined instructional courses for a date and time on each of the teaching calendar schedules has been assigned one or more of the plurality of lesson plans stored in the lesson plan depository, each of the teaching calendar schedules being accessible by the administrative computer to monitor the one or more lesson plans to the plurality of predetermined instructional courses;

indicating on each of the teaching calendar schedules for each of the plurality of teachers whether the one or more of the plurality of lesson plans have been complete; and displaying a status indicator indicating a number of times each one or more objectives have been chosen by each one of the plurality of teachers so that each one of the plurality of teachers can more readily monitor a progress of the one or more objectives and so that the administrative computer can more readily monitor the progress of one or more of the plurality of teachers.

2. The system as defined in claim 1, the computer program further comprising a search module to enable searching the one or more databases, the search module comprising the instruction of:

searching the lesson plan depository for one or more of the plurality of lesson plans stored therein by keyword, grade level or course responsive to user input.

3. The system as defined in claim 1, the lesson plan module further comprising the instruction of:

forming a lesson plan creation page having a plurality of features to assemble and complete the one or more lesson plans, and a feature configured to access a bank of completed lesson-plans, each one of the completed lesson plans comprising objectives, resources, strategies, assessments, activities, and homework assignments.

4. The system as defined in claim 1, wherein the status indicator is one of a plurality of status indicators and one or more of the plurality of status indicators are color coded with a first color to indicate no lesson plan has been assigned to the date and time, and a second color to indicate one or more lesson plans has been assigned to the date and time.

5. The system as defined in claim 1, the computer program further comprising a search module to enable searching the one or more databases, the search module comprising the instructions of:
   searching the lesson plan depository for one or more of the plurality of lesson plans stored therein by keyword, grade level or courses responsive to user input; and
   importing one or more lesson plans for one or more of the plurality of predetermined instructional courses from the lesson plan depository responsive to searching the lesson plan depository.

6. The system as defined in claim 1, the lesson plan module further comprising the instruction of:
   importing one or more lesson plans for one or more of the plurality of predetermined instructional courses from the lesson plan depository.

7. A non-transitory computer readable medium having computer program stored therein, the computer program operable on a computer associated with an educational institution to define an educational institution computer and comprising a set of instructions that when executed by the educational institution computer cause the educational institution computer to perform a process of assigning a plurality of teachers to scheduling requirements for the educational institution, the computer program comprising:
   an instructional course associator module to establish a plurality of teachers at an educational institution to teach a plurality of predetermined instructional courses, the instructional course associator module comprising the instructions of:
   establishing, by the educational institution computer responsive to receiving user input commands from an administrative computer, each of the plurality of teachers at the educational institution as teaching one or more of the plurality of predetermined instructional courses to be taught during substantially all a future term to thereby set an instructional term curriculum schedule;
   retrieving data from one or more databases to populate one or more sections of a plurality of teacher profiles including name of the teacher, one or more classroom locations, and institutional term, each of the plurality of teacher profiles being stored in the one or more databases and associated with one of the plurality of teachers; and
   communicating, via a communication network, the instructional term curriculum schedule to each of the plurality of teacher computers responsive to the establishing step
   assigning each one of the plurality of predetermined instructional courses from the instructional term curriculum schedule with one of the plurality of teacher profiles to thereby create a schedule depository, the schedule depository having one or more fields indicating days of a week and a plurality of times during the days of the week;
   a calendar scheduler module to build a teaching calendar schedule for each of the plurality of teachers, the calendar scheduler module comprising the instructions of:
   assigning each one of the plurality of predetermined instructional courses to one or more days and a time of the one or more days in the schedule depository to thereby build the teaching calendar schedule for each of the plurality of teachers, the schedule depository further having each of teaching calendar schedules;
   a lesson plan module to assign a plurality of lesson plans to a respective one or more of the plurality of teacher profiles, the lesson plan module comprising the instructions of:
   creating a share network comprising a plurality of sharing teachers from the plurality of teachers, each one of the sharing teachers allowing another of the plurality of sharing teachers to access each one of the sharing teacher's lesson-plans from each one of the plurality of school terms stored in the lesson plan depository;
   creating one or more lesson plans for one or more of the plurality of predetermined instructional courses for one or more days and one or more times in the schedule depository, each of the one or more lesson plans being stored in a lesson plan depository on the one or more databases;
   assigning one or more of the plurality of lesson plans stored in the lesson plan depository to one or more of the plurality of predetermined instructional courses, one or more days, and a time of the one or more days on one or more of the teaching calendar schedules, the one or more of the plurality of lesson plans to be implemented by one or more of the plurality of teachers; and
   a status indicator module to indicate on each of the teaching calendar schedule whether one or more of the plurality of predetermined instructional courses for a date and time on the teaching calendar schedules have been assigned one or more lesson plans, the status indicator module comprising the instruction of:
   indicating on each of the teaching calendar schedules for each of the plurality of teachers whether one or more of the plurality of predetermined instructional courses for a date and time on each of the teaching calendar schedules has been assigned one or more of the plurality of lesson plans stored in the lesson plan depository, each of the teaching calendar schedules being accessible by the administrative computer to monitor the one or more lesson plans to the plurality of predetermined instructional courses;
   indicating on each of the teaching calendar schedules for each of the plurality of teachers whether the one or more of the plurality of lesson plans have been complete; and
   displaying a status indicator indicating a number of times each one or more objectives have been chosen by each one of the plurality of teachers so that each one of the plurality of teachers can more readily monitor a progress of the one or more objectives and so that the administrative computer can more readily monitor the progress of one or more of the plurality of teachers.

8. The non-transitory computer readable medium as defined in 7, the computer program further comprising a search module to enable searching the one or more databases, the search module comprising the instruction of:
   searching the lesson plan depository for one or more of the plurality of lesson plans stored therein by keyword, grade level or course responsive to user input.

9. The non-transitory computer readable medium as defined in 7, the lesson plan module further comprising the instruction of:
   forming a lesson plan creation page having a plurality of features to assemble and complete the one or more lesson plans, and a feature configured to access a bank of completed lesson-plans, each one of the completed lesson plans comprising objectives, resources, strategies, assessments, activities, and homework assignments.

10. The non-transitory computer readable medium as defined in 7, wherein the status indicator is one of a plurality of status indicators and one or more of the plurality of status indicators are color coded with a first color to indicate no lesson plan has been assigned to the date and time, and a second color to indicate one or more lesson plans has been assigned to the date and time.

11. The non-transitory computer readable medium as defined in 7, the lesson plan module further comprising the instruction of:

importing one or more lesson plans for one or more of the plurality of predetermined instructional courses from the lesson plan depository.

12. A computer-implemented method of managing and organizing teacher class schedules and lesson plans for an educational institution, the method comprising:

establishing, by a computer associated with an educational institution to define an educational institution computer, responsive to receiving user input commands from an administrative computer each of the plurality of teachers at the educational institution as teaching one or more of a plurality of predetermined instructional courses to be taught during substantially all a future term to thereby set an instructional term curriculum schedule;

retrieving, by the educational institution computer, data from one or more databases to populate one or more sections of a plurality of teacher profiles including name of the teacher, one or more classroom locations, and institutional term, each of the plurality of teacher profiles being stored in the one or more databases and associated with one of the plurality of teachers;

communicating, via a communication network, the instructional term curriculum schedule to each of the plurality of teacher computers responsive to the establishing step assigning, by the educational institution computer, each one of the plurality of predetermined instructional courses from the instructional term curriculum schedule with one of the plurality of teacher profiles to thereby create a schedule depository, the schedule depository having one or more fields indicating days of a week and a plurality of times during the days of the week;

assigning, by the educational institution computer, each one of the plurality of predetermined instructional courses to one or more days and a time of the one or more days in the schedule depository to thereby build a teaching calendar schedule for each of the plurality of teachers, the schedule depository further having each of the teaching calendar schedules;

creating, by the educational institution computer, a share network comprising a plurality of sharing teachers from the plurality of teachers, each one of the sharing teachers allowing another of the plurality of sharing teachers to access each one of the sharing teacher's lesson-plans from each one of the plurality of school terms stored in the lesson plan depository;

creating, by the educational institution computer, one or more lesson plans for one or more of the plurality of predetermined instructional courses for one or more days and one or more times in the schedule depository, each of the one or more lesson plans being stored in a lesson plan depository on the one or more databases;

assigning, by the educational institution computer, one or more of the plurality of lesson plans stored in the lesson plan depository to one or more of the plurality of predetermined instructional courses, one or more days, and a time of the one or more days on one or more of the teaching calendar schedules, the one or more of the plurality of lesson plans to be implemented by one or more of the plurality of teachers;

indicating, by the educational institution computer, on each of the teaching calendar schedules for each of the plurality of teachers whether one or more of the plurality of predetermined instructional courses for a date and time on each of the teaching calendar schedules has been assigned one or more of the plurality of lesson plans stored in the lesson plan depository, each of the teaching calendar schedules being accessible by the administrative computer to monitor the one or more lesson plans to the plurality of predetermined instructional courses;

indicating, by the educational institution computer, on each of the teaching calendar schedules for each of the plurality of teachers whether the one or more of the plurality of lesson plans have been complete; and displaying, by the educational institution computer, a status indicator indicating a number of times each one or more objectives have been chosen by each one of the plurality of teachers so that each one of the plurality of teachers can more readily monitor a progress of the one or more objectives and so that the administrative computer can more readily monitor the progress of one or more of the plurality of teachers.

13. The computer-implemented method as defined in 12, the method further comprising:

searching, by the educational institution computer, the lesson plan depository for one or more of the plurality of lesson plans stored therein by keyword, grade level or course responsive to user input.

14. The computer-implemented method as defined in 12, the method further comprising:

forming a lesson plan creation page having a plurality of features to assemble and complete the one or more lesson plans, and a feature configured to access a bank of completed lesson-plans, each one of the completed lesson plans comprising objectives, resources, strategies, assessments, activities, and homework assignments.

15. The computer-implemented method as defined in 12, wherein the status indicator is one of a plurality of status indicators and one or more of the plurality of status indicators are color coded with a first color to indicate no lesson plan has been assigned to the date and time, and a second color to indicate one or more lesson plans has been assigned to the date and time; and the method further comprising:

importing one or more lesson plans for one or more of the plurality of predetermined instructional courses from the lesson plan depository.

* * * * *